(12) United States Patent
Cao et al.

(10) Patent No.: US 12,147,270 B2
(45) Date of Patent: Nov. 19, 2024

(54) ELECTRONIC DEVICE COMPRISING CAMERA MODULE

(71) Applicant: SAMSUNG ELECTRONICS CO., LTD., Gyeonggi-do (KR)

(72) Inventors: Doan Xuan Cao, Bac Ninh province (VN); Tung Duc Nguyen, Bac Ninh province (VN); Thai Ba Dao, Bac Ninh province (VN); Jintack Shin, Gyeonggi-do (KR); Kukyoul Moon, Gyeonggi-do (KR); Taihoon Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 718 days.

(21) Appl. No.: 17/312,275

(22) PCT Filed: Jan. 21, 2020

(86) PCT No.: PCT/KR2020/001041
§ 371 (c)(1),
(2) Date: Jun. 9, 2021

(87) PCT Pub. No.: WO2020/159141
PCT Pub. Date: Aug. 6, 2020

(65) Prior Publication Data
US 2022/0107668 A1    Apr. 7, 2022

(30) Foreign Application Priority Data

Jan. 28, 2019   (KR) .................. 10-2019-0010657

(51) Int. Cl.
*G06F 1/16*   (2006.01)
*H04M 1/02*   (2006.01)
(Continued)

(52) U.S. Cl.
CPC .......... *G06F 1/1656* (2013.01); *G06F 1/1686* (2013.01); *H04M 1/0264* (2013.01); *H04N 23/51* (2023.01); *H04N 23/55* (2023.01)

(58) Field of Classification Search
CPC ...... H04N 23/51; H04N 23/55; H04M 1/0264
See application file for complete search history.

(56) References Cited

U.S. PATENT DOCUMENTS

| | | |
|---|---|---|
| 2012/0178382 A1 | 7/2012 | Merz et al. |
| 2012/0206669 A1 | 8/2012 | Kim et al. |

(Continued)

FOREIGN PATENT DOCUMENTS

| | | |
|---|---|---|
| CN | 102636896 | 8/2012 |
| CN | 106102985 | 11/2016 |

(Continued)

OTHER PUBLICATIONS

PCT/ISA/210 Search Report issued on PCT/KR2020/001041, May 7, 2020, pp. 7.

(Continued)

*Primary Examiner* — Ephrem Z Mebrahtu
(74) *Attorney, Agent, or Firm* — The Farrell Law Firm, P.C.

(57) ABSTRACT

Various embodiments disclosed in this document relate to an electronic device comprising a camera module and, more specifically, to an electronic device configured to prevent the optical performance (for example, resolution) of a camera module from being degraded by an uneven surface of cover glass (for example, a window). According to various embodiments disclosed in this document, provided is an electronic device comprising: a housing comprising a first plate and a second plate disposed near a lateral or rear side of the first plate; a display disposed between the first plate and the second plate so as to display a screen through at least (Continued)

a part of the first plate; and a camera module for acquiring external information on the basis of light that has passed through at least a part of the first plate. The first plate comprises: a transparent member comprising a transparent area for displaying the screen of the display; a masking layer disposed on the back surface of the transparent member so as to form an opaque area near the transparent area of the transparent member; a recess formed on the masking layer such that light that has passed through at least a part of the first plate is directed towards the camera module; and a filling member filling the recess. Various other embodiments are applicable.

15 Claims, 21 Drawing Sheets

(51) Int. Cl.
*H04N 23/51* (2023.01)
*H04N 23/55* (2023.01)

(56) References Cited

U.S. PATENT DOCUMENTS

| | | | |
|---|---|---|---|
| 2013/0076649 A1 | 3/2013 | Myers et al. | |
| 2013/0177302 A1 | 7/2013 | Weber | |
| 2013/0313672 A1* | 11/2013 | Min | G02B 5/22 |
| | | | 257/434 |
| 2014/0022650 A1 | 1/2014 | Wolterink et al. | |
| 2014/0313404 A1* | 10/2014 | Miao | G02F 1/153 |
| | | | 359/275 |
| 2015/0092277 A1 | 4/2015 | Ozawa | |
| 2015/0212549 A1 | 7/2015 | Shin et al. | |
| 2015/0280767 A1 | 10/2015 | Ames et al. | |
| 2017/0287992 A1 | 10/2017 | Kwak et al. | |
| 2017/0310890 A1 | 10/2017 | Wan et al. | |
| 2018/0076246 A1 | 3/2018 | Chen et al. | |
| 2019/0250793 A1 | 8/2019 | Choi et al. | |
| 2019/0334128 A1* | 10/2019 | Kim | H10K 50/86 |
| 2019/0346593 A1 | 11/2019 | Lee et al. | |
| 2021/0088830 A1* | 3/2021 | Tang | G02B 6/0068 |

FOREIGN PATENT DOCUMENTS

| | | |
|---|---|---|
| CN | 107241465 | 10/2017 |
| CN | 107465863 | 12/2017 |
| CN | 107547708 | 1/2018 |
| CN | 108200237 | 6/2018 |
| CN | 108307095 | 7/2018 |
| EP | 3 322 175 | 5/2018 |
| JP | 2012-168506 | 9/2012 |
| KR | 10-2013-0115319 | 10/2013 |
| KR | 1020140066253 | 5/2014 |
| KR | 1020150088658 | 8/2015 |
| KR | 10-1701368 | 2/2017 |
| KR | 10-1725609 | 4/2017 |
| KR | 1020170040082 | 4/2017 |
| KR | 10-2018-0081935 | 7/2018 |
| WO | WO 2008/011003 | 1/2008 |
| WO | WO 2018/008924 | 1/2018 |

OTHER PUBLICATIONS

PCT/ISA/237 Written Opinion issued on PCT/KR2020/001041, May 7, 2020, pp. 5.
Chinese Office Action dated Sep. 27, 2023 issued in counterpart application No. 202080011402.5, 17 pages.
Chinese Office Action dated Dec. 25, 2023 issued in counterpart application No. 202080011402.5, 10 pages.
Chinese Office Action dated Jun. 29, 2023 issued in counterpart application No. 202080011402.5, 21 pages.
Korean Office Action dated Feb. 13, 2023 issued in counterpart application No. 10-2019-0010657, 15 pages.
European Search Report dated Jan. 21, 2022 issued in counterpart application No. 20749473.3-1216, 9 pages.

* cited by examiner

ELECTRONIC DEVICE COMPRISING CAMERA MODULE

PRIORITY

This application is a National Phase Entry of PCT International Application No. PCT/KR2020/001041, which was filed on Jan. 21, 2020 and claims priority to Korean Patent Application No. 10-2019-0010657, which was filed on Jan. 28, 2019 in the Korean Intellectual Property Office, the content of each of which is incorporated herein by reference.

FIELD

Various embodiments of the disclosure relate to electronic devices including a camera module.

DESCRIPTION OF THE RELATED ART

Generally, the electronic device means a device performing a particular function according to its equipped program, such as a home appliance, an electronic scheduler, a portable multimedia player, a mobile communication terminal, a tablet PC, a video/sound device, a desktop PC or laptop computer, a navigation for automobile, etc. For example, electronic devices may output stored information as voices or images. As electronic devices are highly integrated and high-speed, high-volume wireless communication becomes commonplace, mobile communication terminals are recently being equipped with various functions. For example, an electronic device comes with the integrated functionality, including an entertainment function, such as playing video games, a multimedia function, such as replaying music/videos, a communication and security function for mobile banking, and a scheduling or e-wallet function. Further, an electronic device may include one or more camera modules, and the electronic device may directly record and store an external image or video through the camera module.

Electronic devices, such as portable computers and mobile phones, generally include a display. To protect the display from damage, many electronic devices may include a cover glass (hereinafter, referred to as a "window"). The window may serve to protect the display mounted under the window from scratches and other damage. Here, a black masking layer may be formed on the rear surface of the window to form an opaque boundary region for hiding internal components of the electronic device. Further, holes corresponding to the lenses of the camera modules embedded in the electronic device may be formed in the masking layer.

SUMMARY

The performance of the camera module may be degraded by the uneven surface of the window.

For example, the surface of the window may not be even or flat due to fine marks caused by the mold frame during the manufacturing process. Recently, as optical modules with good optical performance (e.g., resolution) are gradually popularized, fine marks caused by the mold frame may be visually recognized in the images or videos obtained by the optical module, deteriorating quality.

To compensate for the uneven surface of the window, a polymer may fill the hole formed in the masking layer. However, when filling the hole formed in the masking layer, the polymer near the inner wall of the hole may be fixed in a curved state due to the effect of surface tension. For example, if the hole formed in the masking layer is filled with polymer, the polymer may be fixed in a convex shape at the center of the hole, and if less polymer fills the hole formed in the masking layer, the polymer may be fixed in a concave shape at the center of the hole. As such, as the polymer is formed in a curved shape near the inner wall of the hole, the traveling direction of light passing through the portion may be bent, so that the image or video may be distorted. Therefore, given the field of view (FOV) of the optical module, it is possible to prevent the image or video from being distorted when light is incident through the flat part of the polymer.

According to some embodiments, a window including a curved portion may be mounted on the electronic device. A user input or a screen display function may be provided through the surface of the curved portion of the window, and the electronic device may have a more attractive look. However, an electronic device equipped with a window including a curved portion may have difficulty in securing a FOV of the optical module due to trouble with securing a flat portion of the polymer as compared to an electronic device equipped with a flat window. Further, during the thermoforming process for making the curved portion, the marks caused by the mold frame remaining on the surface of the window may be visually recognized in the image or video.

In various embodiments of the present invention, there is provided an electronic device that may secure a sufficient FOV of an optical module despite application of a window including a curved portion.

According to various embodiments of the disclosure, there may be provided an electronic device comprising a housing including a first plate and a second plate disposed on a side of or behind the first plate and a camera module configured to obtain external information based on light passing through at least a portion of the first plate, wherein the first plate includes a transparent member, at least a portion of the transparent member including a substantially transparent region, a masking layer disposed on a rear surface of the transparent member and forming an opaque region around the transparent region of the transparent member, a recess formed in the masking layer and formed to allow the light passing through the at least a portion of the first plate to be directed to the camera module, and a filling member filling the recess.

According to various embodiments of the disclosure, there may be provided an electronic device comprising a housing including a first plate and a second plate disposed on a side of or behind the first plate, a display disposed between the first plate and the second plate and displaying a screen through at least a portion of the first plate, and a camera module configured to obtain external information based on light passing through at least the portion of the first plate, wherein the first plate includes a transparent member including a transparent region for displaying the screen of the display, a masking layer disposed on a rear surface of the transparent member and forming an opaque region around the transparent region of the transparent member, a stepped recess formed on the masking layer and formed to allow light passing through at least the portion of the first plate to be directed to the camera module, and a filling member filling the stepped recess.

According to various embodiments of the disclosure, there may be provided an electronic device comprising a transparent member, a display displaying a screen through at least a portion of the transparent member, a supporting member supporting a rear surface of the display, and a camera module obtaining external information based on light passing through at least the portion of the transparent member, wherein a recess is formed in each of the display and the supporting member to allow the light passing through at least the portion of the transparent member to be directed to the camera module, wherein a width of the recess formed in the supporting member is larger than a width of the recess formed in the display, and wherein the recess formed in the display and the supporting member is filled with a filling member.

In the electronic device according to various embodiments of the disclosure, in forming a recess in a masking layer forming an opaque region of a front plate (hereinafter referred to as a 'first plate'), the recess may be filled with a filling member, preventing deterioration of the resolution of the camera module due to the uneven surface of the first plate.

In the electronic device according to an embodiment of the disclosure, a stepped recess may be formed, rendering it easy to secure a field of view (FOV) upon filling the recess with a filling member.

In the electronic device according to an embodiment of the disclosure, a field of view (FOV) may easily be secured by double-filling the recess with filling members.

In the electronic device according to an embodiment of the disclosure, a field of view (FOV) may easily be secured by filling the recess with a filling member and placing a second transparent member on the filling member.

BRIEF DESCRIPTION OF THE DRAWINGS

The same or similar reference denotations may be used to refer to the same or similar elements throughout the specification and the drawings.

DETAILED DESCRIPTION

Figure 1:
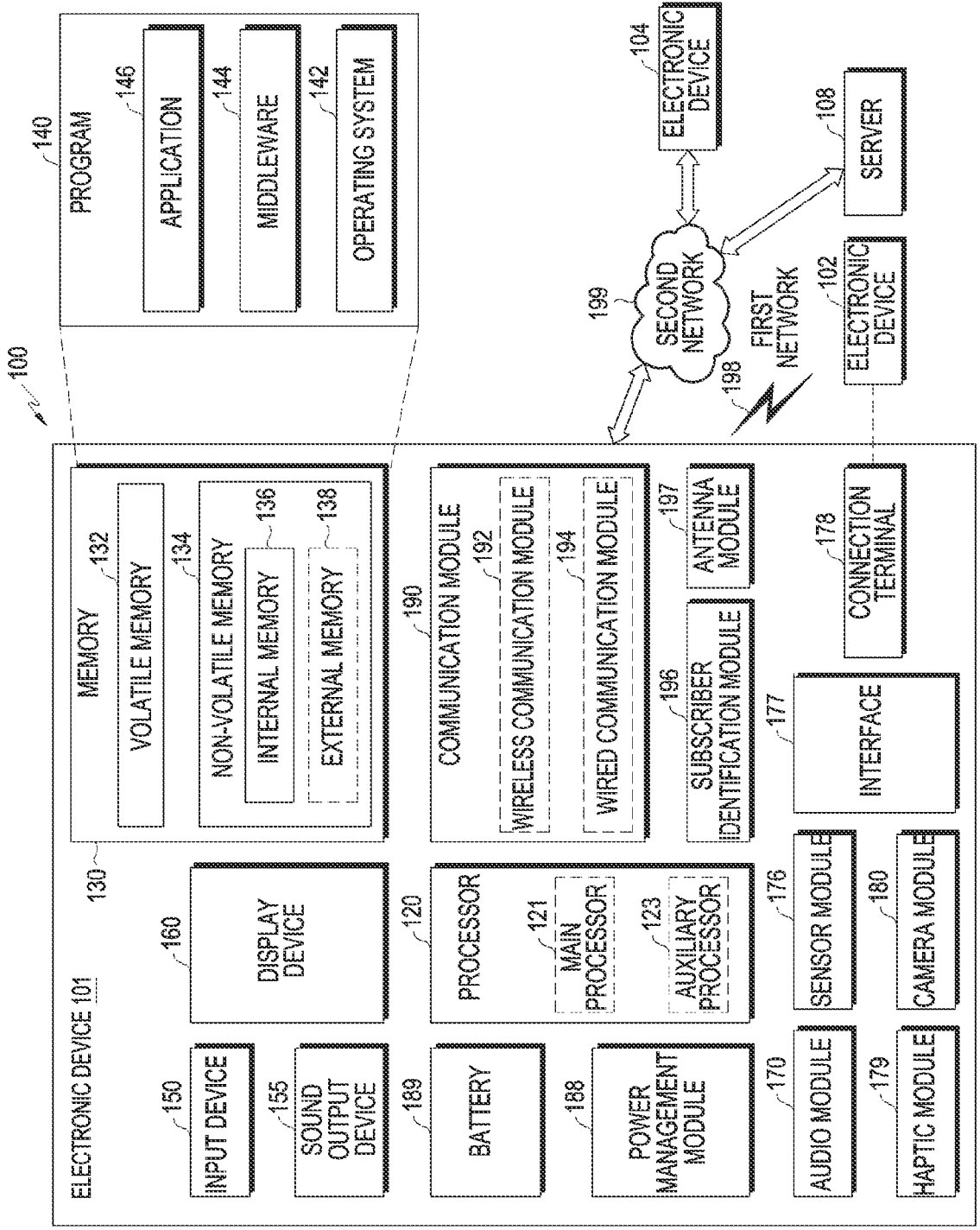
FIG. 1 is a block diagram illustrating an electronic device in a network environment according various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly.

According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
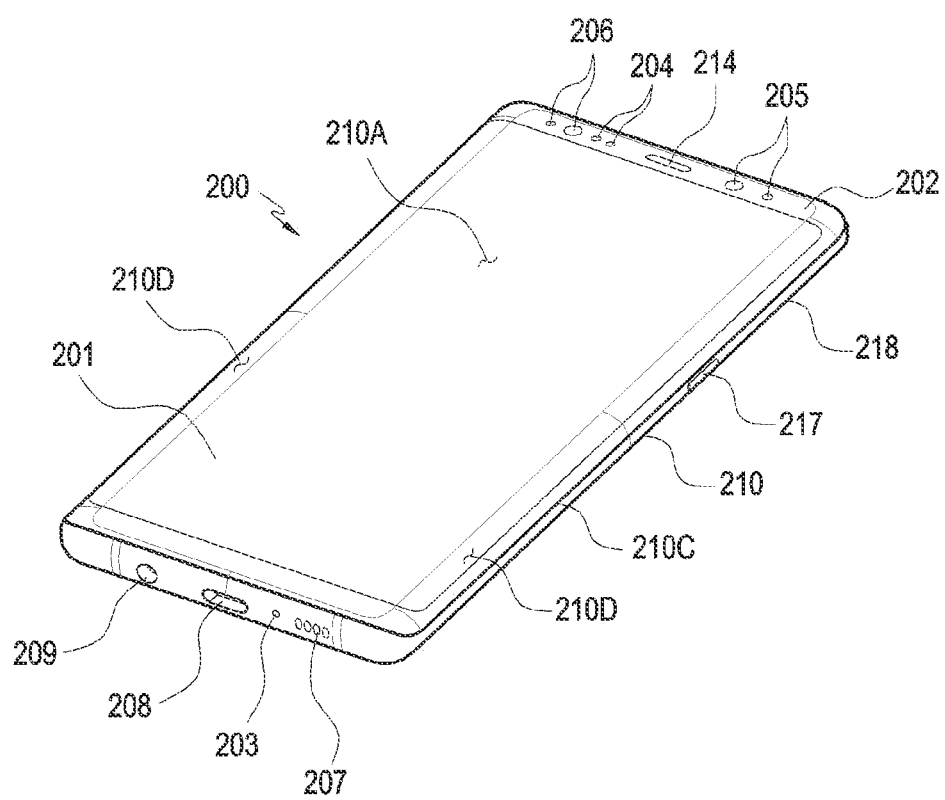
FIG. 2 is a front perspective view illustrating a mobile electronic device according to an embodiment.
Figure 3:
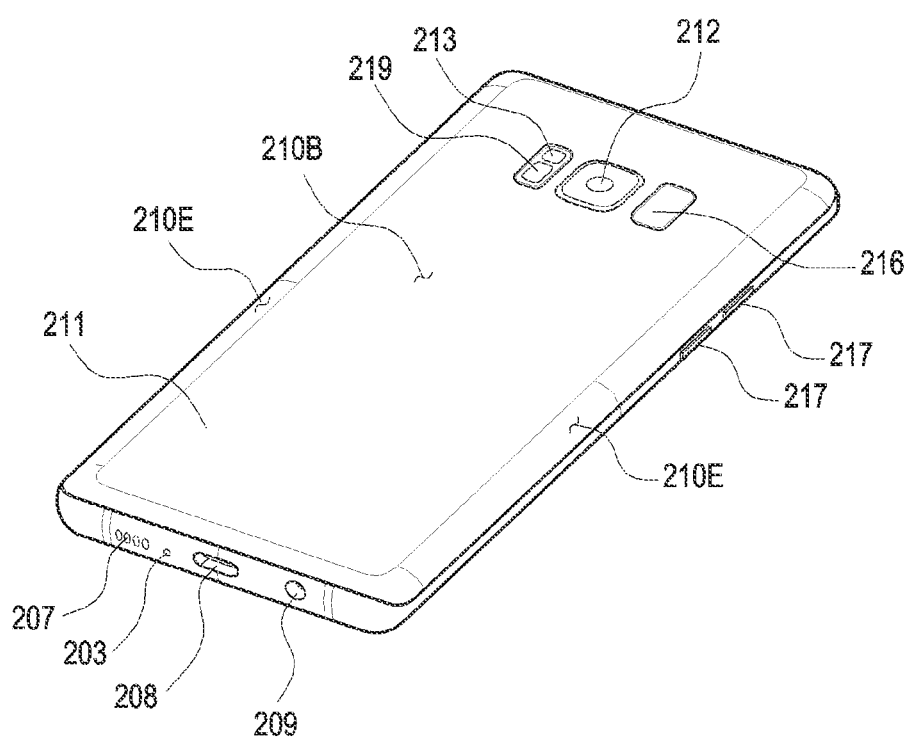
FIG. 3 is a rear perspective view illustrating the electronic device of FIG. 2 according to an embodiment.

FIG. 2 is a front perspective view illustrating a mobile electronic device 200 (e.g., 101 of FIG. 1) according to an embodiment. FIG. 3 is a rear perspective view illustrating the electronic device 200 (e.g., 101 of FIG. 1) of FIG. 2 according to an embodiment.

Referring to FIGS. 2 and 3, the electronic device 200 (e.g., 101 of FIG. 1) according to an embodiment may a housing 210 including a first surface (or front surface) 210A, a second surface (or rear surface) 210B, and a side surface 210C surrounding a space between the first surface 210A and the second surface 210B. According to another embodiment (not shown), the housing may denote a structure forming part of the first surface 210A, the second surface 210B, and the side surface 210C of FIG. 2. According to an embodiment, at least part of the first surface 210A may have a substantially transparent front plate 202 (e.g., a glass plate or polymer plate including various coat layers). The second surface 210B may be formed by a rear plate 211 that is substantially opaque. The rear plate 211 may be formed of, e.g., laminated or colored glass, ceramic, polymer, metal (e.g., aluminum, stainless steel (STS), or magnesium), or a combination of at least two thereof. The side surface 210C may be formed by a side bezel structure (or a "side member") 218 that couples to the front plate 202 and the rear plate 211 and includes a metal and/or polymer. According to an embodiment, the rear plate 211 and the side bezel plate 218 may be integrally formed together and include the same material (e.g., a metal, such as aluminum).

In the embodiment illustrated, the front plate 202 may include two first regions 110D, which seamlessly and bendingly extend from the first surface 210A to the rear plate 211, on both the long edges of the front plate 202. In the embodiment (refer to FIG. 3) illustrated, the rear plate 211 may include second regions 210E, which seamlessly and bendingly extend from the second surface 210B to the front plate 202, on both the long edges. According to an embodiment, the front plate 202 (or the rear plate 211) may include only one of the first regions 210D (or the second regions 210E). Alternatively, the first regions 210D or the second regions 210E may partially be excluded. According to an embodiment, at side view of the electronic device 200, the side bezel structure 218 may have a first thickness (or width) for sides that do not have the first regions 210D or the second regions 210E and a second thickness, which is smaller than the first thickness, for sides that have the first regions 210D or the second regions 210E.

According to an embodiment, the electronic device 200 may include at least one or more of a display 201, audio modules 203, 207, and 214, sensor modules 204, 216, and 219, camera modules 205, 212, and 213, key input devices 217, a light emitting device 206, and connector holes 208 and 209. According to an embodiment, the electronic device 200 may exclude at least one (e.g., the key input device 217 or the light emitting device 206) of the components or may add other components.

The display 201 may be exposed through the top of, e.g., the front plate 202. According to an embodiment, at least a portion of the display 201 may be exposed through the front plate 202 forming the first surface 210A and the first regions 210D of the side surface 210C. According to an embodiment, the edge of the display 201 may be formed to be substantially the same in shape as an adjacent outer edge of the front plate 202. According to an embodiment (not shown), the interval between the outer edge of the display 201 and the outer edge of the front plate 202 may remain substantially even to give a larger area of exposure the display 201.

According to an embodiment (not shown), the screen display region of the display 201 may have a recess or opening in a portion thereof, and at least one or more of the audio module 214, sensor module 204, camera module 205, and light emitting device 206 may be aligned with the recess or opening. According to an embodiment (not shown), at least one or more of the audio module 214, sensor module 204, camera module 205, fingerprint sensor 216, and light emitting device 206 may be included on the rear surface of the screen display region of the display 201. According to an embodiment (not shown), the display 201 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 204 and 219 and/or at least part of the key input devices 217 may be disposed in the first regions 210D and/or the second regions 210E.

The audio modules 203, 207, and 214 may include a microphone hole 203 and speaker holes 207 and 214. The microphone hole 203 may have a microphone inside to obtain external sounds. According to an embodiment, there may be a plurality of microphones to be able to detect the direction of a sound. The speaker holes 207 and 214 may include an external speaker hole 207 and a phone receiver hole 214. According to an embodiment, the speaker holes 207 and 214 and the microphone hole 203 may be implemented as a single hole, or speakers may be rested without the speaker holes 207 and 214 (e.g., piezo speakers).

The sensor modules 204, 216, and 219 may generate an electrical signal or data value corresponding to an internal operating state or external environmental state of the electronic device 200. The sensor modules 204, 216, and 219 may include a first sensor module 204 (e.g., a proximity sensor) and/or a second sensor module (not shown) (e.g., a fingerprint sensor) disposed on the first surface 210A of the housing 210 and/or a third sensor module 219 (e.g., a heart-rate monitor (HRM) sensor) and/or a fourth sensor module 216 (e.g., a fingerprint sensor) disposed on the second surface 210B of the housing 210. The fingerprint sensor may be disposed on the second surface 210A as well as on the first surface 210B (e.g., the display 201) of the housing 210. The electronic device 200 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 204.

The camera modules 205, 212, and 213 may include a first camera device 205 disposed on the first surface 210A of the electronic device 200, and a second camera device 212 and/or a flash 213 disposed on the second surface 210B. The camera modules 205 and 212 may include one or more lenses, an image sensor, and/or an image signal processor. The flash 213 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 200.

The key input device 217 may be disposed on the side surface 210C of the housing 210. According to an embodiment, the electronic device 200 may exclude all or some of the above-mentioned key input devices 217 and the excluded key input devices 217 may be implemented in other forms, e.g., as soft keys, on the display 201. According to an embodiment, the key input device may include the sensor module 216 disposed on the second surface 210B of the housing 210.

The light emitting device 206 may be disposed on, e.g., the first surface 210A of the housing 210. The light emitting device 206 may provide, e.g., information about the state of the electronic device 200 in the form of light. According to an embodiment, the light emitting device 206 may provide a light source that interacts with, e.g., the camera module 205. The light emitting device 206 may include, e.g., a light emitting device (LED), an infrared (IR) LED, or a xenon lamp.

The connector holes 208 and 209 may include a first connector hole 208 for receiving a connector (e.g., a universal serial bus (USB) connector) for transmitting or receiving power and/or data to/from an external electronic device and/or a second connector hole 209 (e.g., an earphone jack) for receiving a connector for transmitting or receiving audio signals to/from the external electronic device.

Figure 4:
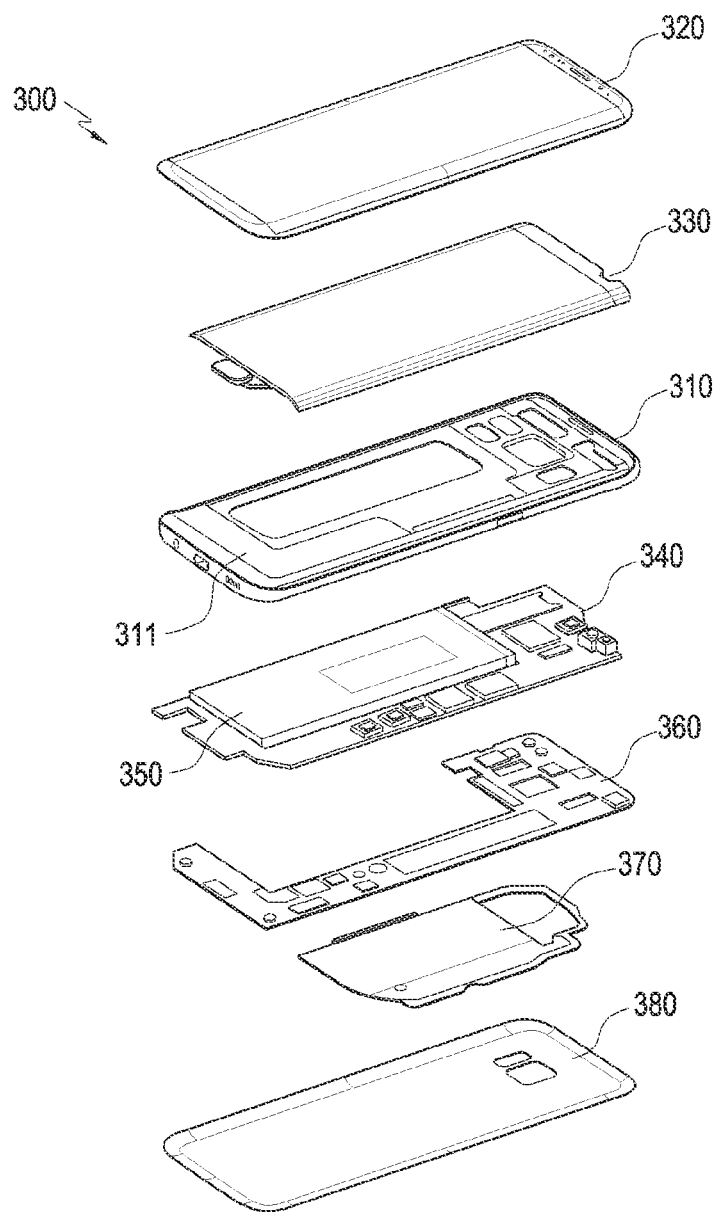
FIG. 4 is an exploded perspective view illustrating the electronic device of FIG. 2 according to an embodiment.

FIG. 4 is an exploded perspective view illustrating the electronic device 300 of FIG. 2 (e.g., 101 of FIG. 1) according to an embodiment.

Referring to FIG. 4, an electronic device 300 (e.g., 101 of FIG. 1) may include a side bezel structure 310, a first supporting member 311 (e.g., a bracket), a front plate 320, a display 330, a printed circuit board (PCB) 340, a battery 350, a second supporting member 360 (e.g., a rear case), an antenna 370, and a rear plate 380. According to an embodiment, the electronic device 300 may exclude at least one (e.g., the first supporting member 311 or second supporting member 360) of the components or may add other components. At least one of the components of the electronic device 300 may be the same or similar to at least one of the components of the electronic device 200 of FIG. 2 or 3 and no duplicate description is made below.

The first supporting member 311 may be disposed inside the electronic device 300 to be connected with the side bezel structure 310 or integrated with the side bezel structure 310. The first supporting member 311 may be formed of, e.g., a metal and/or non-metallic material (e.g., polymer). The display 330 may be joined onto one surface of the first supporting member 311, and the printed circuit board 340 may be joined onto the opposite surface of the first supporting member 311. A processor, memory, and/or interface may be mounted on the printed circuit board 340. The processor may include one or more of, e.g., a central processing unit, an application processor, a graphic processing device, an image signal processing, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 300 with an external electronic device and may include a USB connector, an SD card/multimedia card (MMC) connector, or an audio connector.

The battery 350 may be a device for supplying power to at least one component of the electronic device 300. The battery 189 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 300.

The antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. According to an embodiment, an antenna structure may be formed by a portion or combination of the side bezel structure 310 and/or the first supporting member 311.

Figure 5:
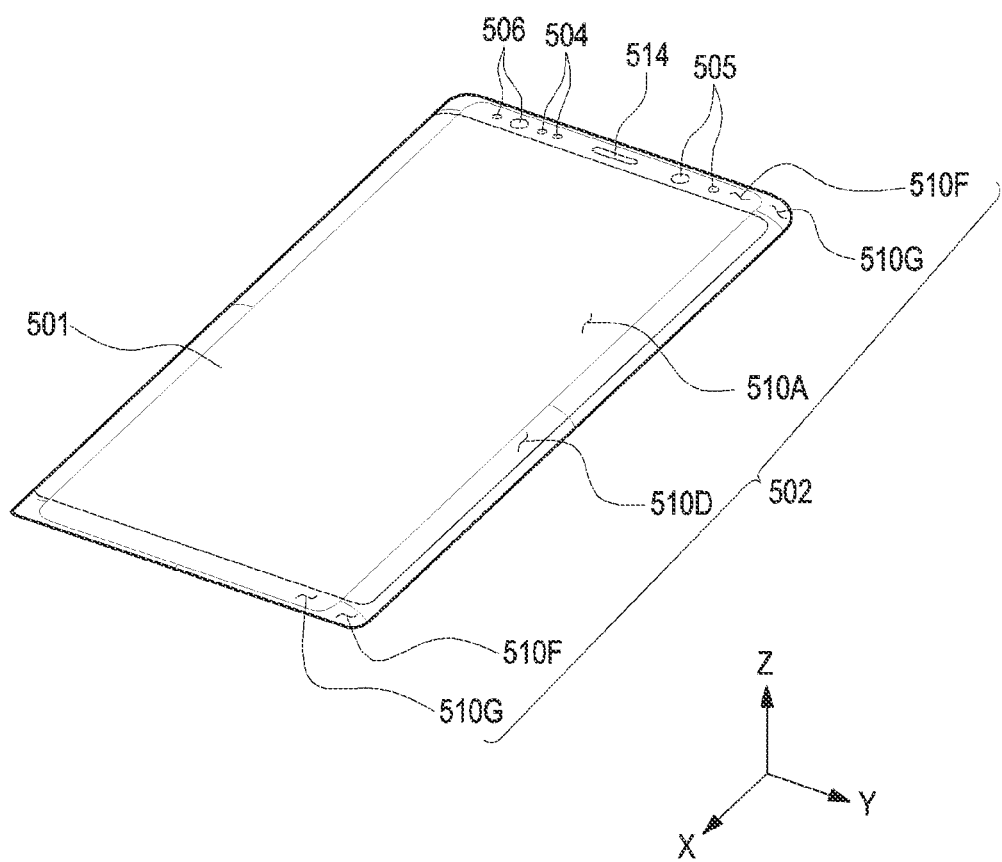
FIG. 5 is a perspective view illustrating a first plate of an electronic device according to an embodiment.

FIG. 5 is a perspective view illustrating a first plate 502 (e.g., the front plate 202 of FIG. 2) of an electronic device (e.g., 101 of FIG. 1) according to an embodiment.

Figure 6A:
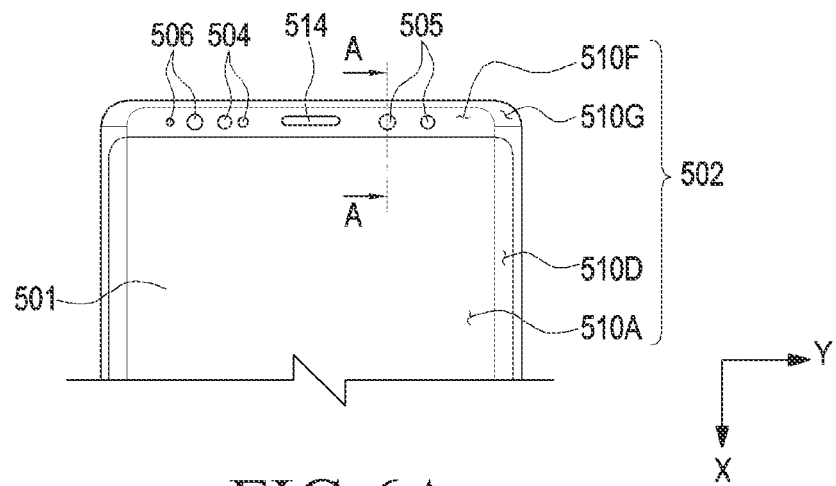
FIG. 6 is a view illustrating a first plate of an electronic device according to various embodiments.
Figure 6B:
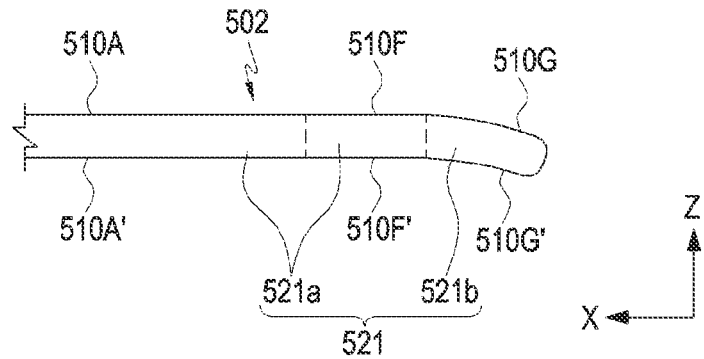
Figure 6C:
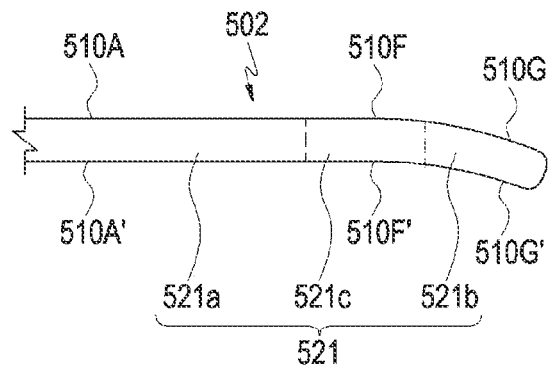

FIG. 6 is a view illustrating a first plate 502 of an electronic device (e.g., 101 of FIG. 1) according to various embodiments. Specifically, FIG. 6A is a front view illustrating a first plate 502 of an electronic device (e.g., 101 of FIG. 1) according to an embodiment. FIG. 6B is a side cross-sectional view illustrating the first plate 502 of the electronic device (e.g., 101 of FIG. 1) according to an embodiment. FIG. 6C is a side cross-sectional view illustrating the first plate 502 of the electronic device (e.g., 101 of FIG. 1) according to another embodiment.

Referring to FIG. 5, an electronic device (e.g., 101 of FIG. 1) may include a first plate 502, a second plate (e.g., a rear plate (e.g., 211 of FIG. 3) and/or a side bezel structure (e.g., FIG. 2 of 218)). Although not separately illustrated in FIGS. 5 to 6B, a second plate (e.g., a rear plate and/or a side bezel structure) may be coupled with the first plate 502 to configure a housing (e.g., 210 of FIG. 2) for protecting the electronic components inside the electronic device. The housing (e.g., 210 of FIG. 2) may at least partially include metal and/or an insulating material and provide a space for receiving the electronic components (e.g., a display, camera module, sensor module, or battery) and/or a bracket thereinside.

The first plate 502 may correspond to a window for providing visual information to be displayed on an electronic component (e.g., the display 501) inside the electronic device to the outside (e.g., the user). To that end, at least a portion of the first plate 502 (e.g., 202 of FIG. 2) may be formed to be substantially transparent. Further, other portions of the first plate 502 than the substantially transparent region may be formed to be opaque.

According to an embodiment, the substantially transparent region may be formed in the first surface 510A (e.g., 202 of FIG. 2) and the first region 510D (e.g., 210D of FIG. 2). The substantially opaque portion may be formed in a third region 510F adjacent to the first surface 510A and formed at one end (or both ends) of the short edge of the first plate 502. Further, the opaque portion may be formed in a fourth region 510G formed to surround at least a portion of the third region 510F. According to some embodiments, the fourth region 510G may be disposed not only around the third region 510F but also around the two first regions 510D and may include a portion bent to the second plate (e.g., the rear plate (e.g., 211 of FIG. 211) and/or a side bezel structure (e.g., 218 of FIG. 2).

According to various embodiments, the substantially transparent region may be formed in the first surface 510A (e.g., 202 of FIG. 2), the first region 510D (e.g., 210D of FIG. 2), and the third region 510F of the first plate 502, and the opaque portion may be formed in the fourth region 510G of the first plate 502.

It should be noted that although the third region 510F and the fourth region 510G are formed in the substantially opaque region in the following description, other various embodiments may apply as well.

According to various embodiments, the third region 510F may be a flat portion extending from the first surface 510A to its surroundings or may be a portion that is bent to the rear plate 211 and seamlessly extends as is the first region 510D. According to an embodiment, the third region 510F may be formed not only at the upper end of the first plate 502 but also at the lower end of the first plate 502, as in the embodiment illustrated in FIG. 5.

As described above, the electronic device (e.g., 101 in FIG. 1) may include various components (e.g., a sensor module (e.g., 204 of FIG. 2), a camera module (e.g., 205 of FIG. 2), a light emitting device (e.g., 206 of FIG. 2), and an audio module (e.g., 214 of FIG. 2)). Referring to FIG. 6A, a plurality of recesses (or openings) 504, 505, 506, and 514 may be formed in the first plate 502 to be aligned in the positions where the various components are disposed.

FIG. 6A illustrates an example in which the recesses are formed in the third region 510F of the first plate 502.

According to another embodiment, the recesses may be formed in the first region (e.g., 210D of FIG. 2) and/or the second region (e.g., 210E of FIG. 3). Further, the recesses may be formed at the boundary between the fourth region 510G or the third region 510F and the fourth region 510G.

According to an embodiment, the first plate 502 (e.g., the front plate 202 of FIG. 2) may include a transparent member 521. For example, the transparent member 521 may correspond to a substantially transparent glass plate (or an acrylic plate, a sapphire plate, a ceramic plate, or a polymer plate). The transparent member 521 may be coupled with, e.g., a side bezel structure (e.g., 218 of FIG. 2) including a metal and/or a polymer of an electronic device (e.g., 200 of FIG. 2) and may be a component for protecting various components inside the electronic device from external impacts while exposing the screen displayed on the display 501 through the substantially transparent material to the outside.

FIGS. 6B and 6C are cross-sectional views of the transparent member 521, taken along line A-A of FIG. 6A. According to various embodiments of the disclosure, the transparent member 521 may include a flat portion 521a and a curved portion 521b. According to the embodiment illustrated in FIG. 6B, the flat portion 521a of the transparent member 521 may be divided into a first surface 510A facing in a first direction (e.g., a direction parallel to the direction component z) outside of the electronic device and a third region 510F adjacent to the first surface 510A. Here, the first surface 510A may correspond to a region that is substantially transparent when the electronic device is viewed from the outside, and the third region 510F may correspond to a region that is substantially opaque when the electronic device is viewed from the outside. The substantially opaque region (e.g., the third region 510F) in the transparent member 521 may be formed by disposing a masking layer (e.g., 722 of FIG. 7) to be described below on the rear surface of the transparent member 521.

According to various embodiments, the flat portion 521a of the transparent member 521 includes a first rear surface 510A' facing in a direction opposite to the first direction and may include a second rear surface 510F' that extends from the first rear surface 510A'. Here, the second rear surface 510F' may correspond to a surface positioned opposite the third region 510F in the transparent member 521. According to the embodiment illustrated in FIG. 6B, the curved portion 521b of the transparent member 521 may include a portion forming the fourth region 510G of the first plate 502. The portion forming the fourth region 510G may form a third rear surface 510G' extending from the second rear surface 510F'.

FIG. 6C is a cross-sectional view illustrating a transparent member 521 according to an embodiment different from that of FIG. 6B. According to the embodiment illustrated in FIG. 6C, the transparent member 521 may include a flat portion 521a and a curved portion 521b and may include a middle portion 521c between the flat portion 521a and the curved portion 521b. According to the embodiment of FIG. 6C, the middle portion 521c may form a third region 510F and may form a second rear surface 510F' on the opposite side of the third region 510F. In the embodiment illustrated in FIG. 6C, unlike the embodiment illustrated in FIG. 6B, at least one portion of the third region 510F, which is a substantially opaque region, may be formed as a flat surface, and the other portion may be formed as a curved surface.

As described above, the transparent member 521 may have various embodiments, and as illustrated in FIG. 6C, at least a portion of the third region 510F of the transparent member 521 may include a curved surface. According to an embodiment, a portion forming the third region 510F and a portion forming the fourth region 510G may have radii of curvature similar to each other so as to be smoothly connected without a step near the boundary. According to another embodiment, a portion forming the third region 510F and a portion forming the fourth region 510G in the transparent member 521 may have a curvature that gradually increases or decreases near the boundary thereof. For example, the portion forming the third region 510F and the portion forming the fourth region 510G in the transparent member 521 may have a curvature near the boundary thereof that gradually increases toward the edge of the transparent member 521.

Although the following description of the technical spirit of the disclosure focuses primarily on the components of the transparent 521 in which the third region 510F belongs to the flat portion 521a in connection with the embodiment illustrated in FIG. 6B, it should be noted that the disclosure is not necessarily limited thereto.

Figure 7:
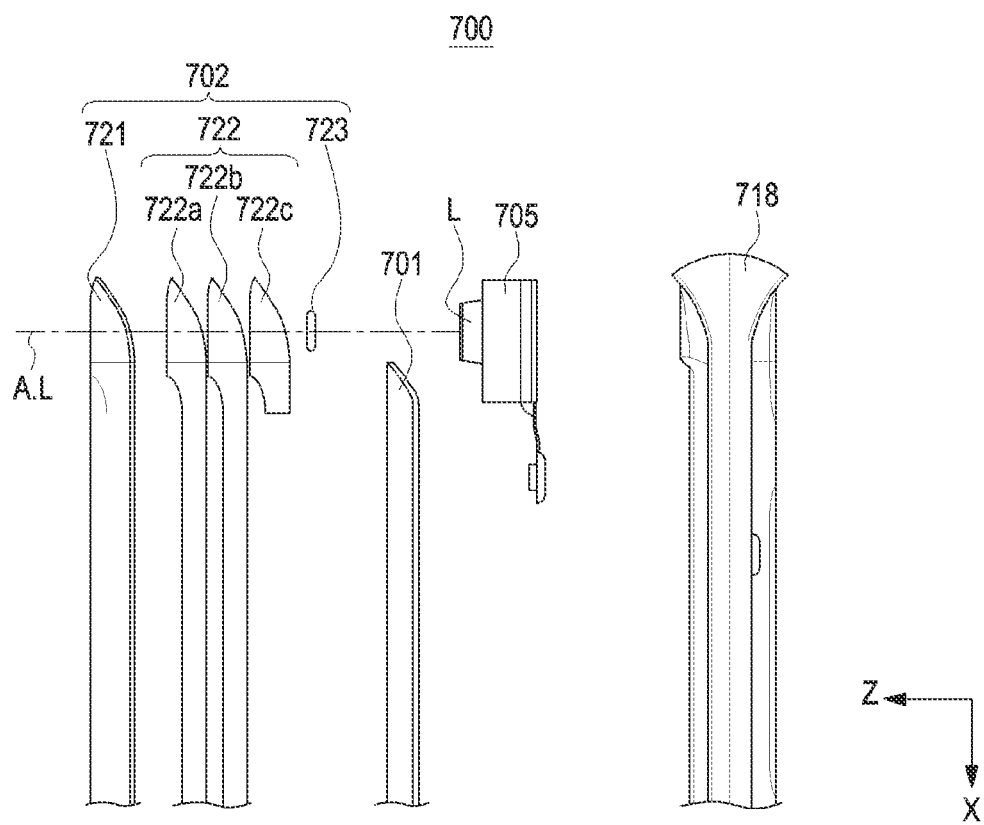
FIG. 7 is an exploded side view illustrating various configurations of an electronic device according to an embodiment.
Figure 8:
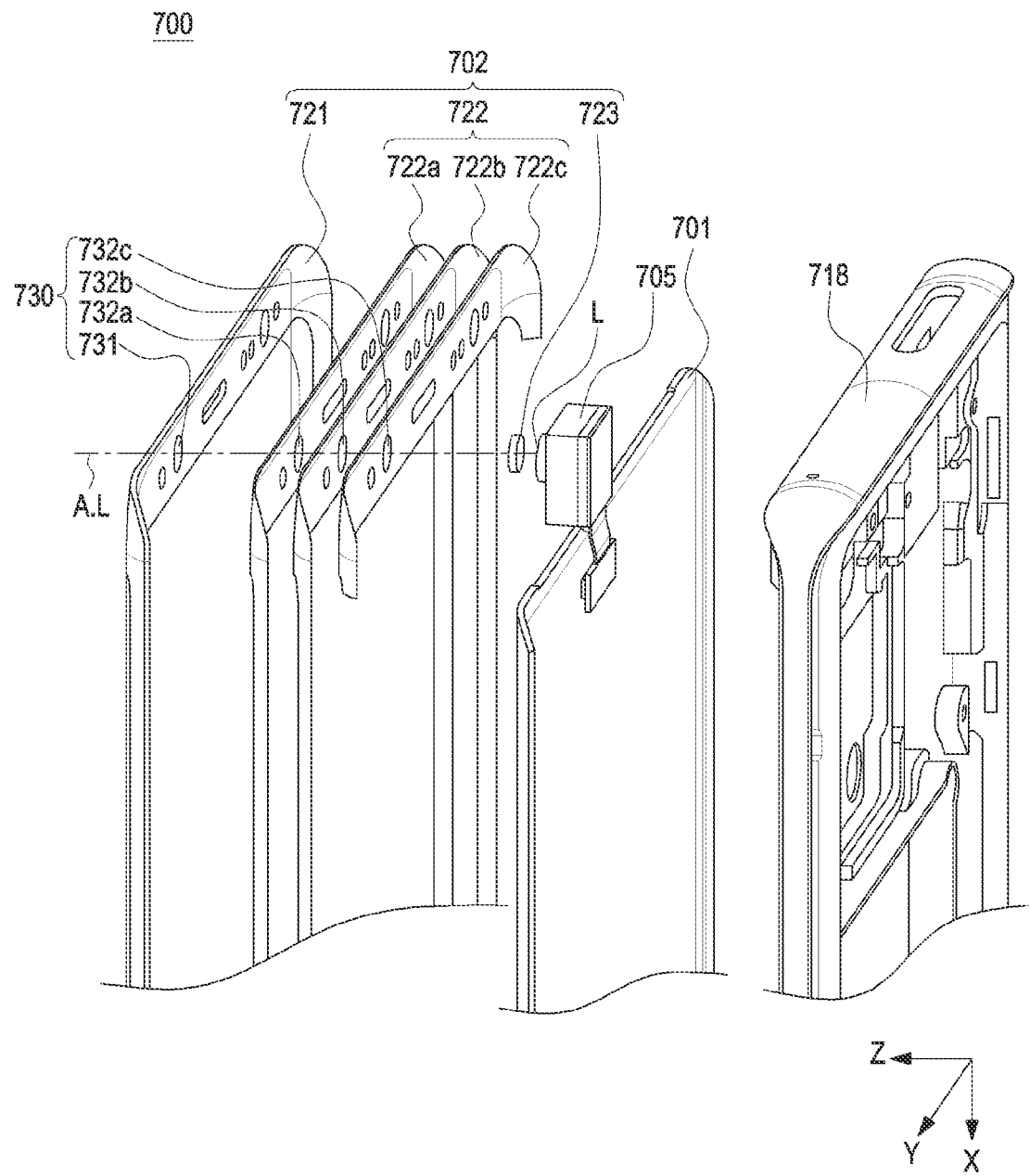
FIG. 8 is an exploded perspective view illustrating the electronic device according to the embodiment illustrated in FIG. 7.

FIG. 7 is an exploded side view illustrating various configurations of an electronic device 700 according to an embodiment of the disclosure. FIG. 8 is an exploded perspective view illustrating the electronic device 700 according to the embodiment illustrated in FIG. 7.

Referring to FIG. 7, an electronic device 700 may include a display 701 (e.g., the display device 160 of FIG. 1) that visually provides various types of information, such as text, images, videos, icons, and symbols to the outside (e.g., the user), a first plate 702 that protects the display 701 and the electronic components embedded in the electronic device 700 from external impacts, and a side bezel structure 718 that provides a rear side of the first plate 702 and a mounting surface for the display 701. Further, the electronic device 701 may include a camera module 705 for performing functions for, e.g., image/video recording or video calls. The electronic device 700 according to an embodiment illustrates the side bezel structure 718 as an embodiment of the second plate, but the disclosure is not limited thereto. According to another embodiment, a rear plate (e.g., 211 of FIG. 3) may be included alternatively or in addition to the side bezel structure 718.

The first plate 702 may further include a masking layer 722. According to an embodiment, the masking layer 722 may be an opaque masking layer. The substantially opaque region of the first plate 702 may be a portion formed by the masking layer 722. The masking layer 722 may be disposed on the rear surface of the transparent member 721 to cover electronic components mounted on the rear surface of the first plate 702.

According to various embodiments, the masking layer 722 may include at least two or more masking layers. For example, the masking layer 722 may be formed of three masking layers as illustrated in FIGS. 7 and 8.

According to various embodiments, the masking layer 722 may be formed of three masking layers including a first layer 722a disposed adjacent to the rear surface of the transparent member 721, a second layer 722b disposed on the rear surface of the first layer 722a, and a third layer 722c disposed on the rear surface of the second layer 722b. The first layer 722a, the second layer 722b, and the third layer 722c may be sequentially stacked.

The first layer 722a may be disposed adjacent to the second rear surface (e.g., 510F' of FIG. 6B) and the third rear surface (e.g., 510G' of FIG. 6B) among the rear surfaces of the transparent member 721. When the first layer 722a is disposed adjacent to the second rear surface (e.g., 510F' of FIG. 6B) and the third rear surface (e.g., 510G' of FIG. 6B), this may mean that the first layer 722a is formed not to be separated from the second rear surface (e.g., 510F' of FIG. 6B) and the third rear surface (e.g., 510G' of FIG. 6B) by various methods, such as evaporation, adhesion, bonding, or printing.

The first layer 722a may be formed along an edge of the transparent member 721. According to an embodiment, a display may be disposed on the first plate 702, corresponding to a screen display area, and the first layer 722a may be formed along a surrounding region surrounding the screen display area, where the region in which the first layer 722a is formed may be a non-screen display area. Referring to FIGS. 7 and 8 together, the first layer 722a may have a shape corresponding to the shape of the edge of the transparent member 721 and may have a portion extending along the edge of the transparent member 721.

The first layer 722a may be a color layer including at least one color. A main color of the first plate 702 may be formed using the first layer 722a. For example, the first layer 722a may be formed in any one or a combination of black, blue, gray, purple, and copper, or may be formed in a combination of other various colors. An exterior color of the electronic device 700 shown to the user may be determined by the first layer 722a.

The second layer 722b may be provided to prevent the light emitted from the display 701 from leaking out through the periphery of the first plate 702, not to the first surface (e.g., 510a of FIG. 6A) after the electronic device 700 is assembled. To that end, the second layer 722b may be disposed under the first layer 722a. The second layer 722b may have a size and shape similar to the size and shape of the first layer 722a to cover at least a portion of the first layer 722a. Like the first layer 722a, the second layer 722b may have a shape corresponding to the shape of the edge of the transparent member 721 and may have a portion extending along the edge of the transparent member 721.

According to an embodiment, the color of the first layer 722b forming the main color may be supplemented or enhanced using the second layer 722b.

The third layer 722c may serve to protect the first layer 722a and the second layer 722b. The first layer 722a and the second layer 722b are components for representing or reinforcing some color and/or preventing light leakage in the masking layer 722 while the third layer 722c may be a component for protecting the masking layer 722 from external impacts. According to an embodiment, the third layer 722c may include a shock-relieving material and/or an elastic material. According to another embodiment, the third layer 722c may function to provide a surface to which an adhesive tape (e.g., 1040 of FIG. 11 to be described below) may be attached to increase the adhesion between the display 701 and the side bezel structure 718.

The size and shape of the third layer 722c may be similar to those of the second layer 722c. The third layer 722c may also have a shape corresponding to the shape of an edge of the transparent member 721. FIGS. 7 and 8 illustrate an example in which the third layer 722c is provided at an end of the shorter edge of the transparent member 721. However, without limitations thereto, the third layer 722c may also have a portion extending along the edge of the transparent member 721.

The second layer 722b may be disposed under the first layer 722a by various methods, such as evaporation, adhesion, bonding, and printing. The third layer 722c may also be disposed under the second layer 722b by various methods, such as evaporation, adhesion, bonding, and printing.

Referring to FIGS. 7 and 8, in which the components of the electronic device 700 are separated from one another, the masking layer 722 may be disposed on the rear surface of the transparent member 721, and the display 701 may be disposed on the rear surface of the transparent member 721 and the masking layer 722. The side bezel structure 718 may be disposed on the rear surface of the display 701, and the side bezel structure 718 may have a shape surrounding the rear and left and right side surfaces of the display 701. The camera module 705 may be disposed on one side of the electronic device 700.

The camera module 705 may be disposed on one side of the housing 701, e.g., the rear surface of the masking layer 722 in the assembly of the electronic device 700 (e.g., a structure in which the transparent member 721, the masking layer 722, the display 701, and the side bezel structure 718 are assembled together). As is described below (e.g., FIG. 11), the camera module 705, together with the display 701, may be disposed in parallel with the surface of the transparent member 721. For example, the camera module 705 may be disposed a predetermined distance apart from the transparent member 721 in a horizontal direction (e.g., a direction parallel to the x-axis).

Although FIG. 7 illustrates an example in which the camera module 705 is positioned on the front surface of the side bezel structure 718, the placement structure of the camera module 705 is not necessarily limited thereto. According to an embodiment, the camera module 705 may be disposed on the front surface or the rear surface of the side bezel structure 718. According to another embodiment, the camera module 705 may be mounted on an inner surface of the rear plate (e.g., 211 of FIG. 3).

The recesses (or openings) may be formed in a portion of the first plate 702. For example, the recesses 730 may be formed in the third region 510F.

The recesses 730 may be formed by a portion 731 of the rear surface of the transparent member 721 and a plurality of openings 732a, 732b, and 732c formed in the masking layer 722. According to an embodiment, the portion 731 of the transparent member 721 may correspond to a portion of the second rear surface (e.g., 510F' of FIG. 6B). According to embodiments, the plurality of openings 732a, 732b, and 732c may be formed in various shapes and sizes corresponding to various electronic components embedded in the electronic device 700. For example, the plurality of openings 732a, 732b, and 732c may have a rounded shape as illustrated in FIG. 8, and may have a size corresponding to the lens unit L. According to an embodiment, the plurality of openings 732a, 732b, and 732c may have a size to satisfy a predetermined field of view (FOV) of the camera module 705.

The portion 731 of the rear surface of the transparent member 721 and the plurality of openings 732a, 732b, and 732c formed in the masking layer 722, along with the lens unit L of the camera module 705, may form an optical alignment structure. FIGS. 7 and 8 illustrate an example in which the portion 731 of the rear surface of the transparent member 721, the plurality of openings 732a, 732b, and 732c formed in the masking layer 722, and the lens unit L of the camera module 705 are aligned along a virtual line A.L.

According to various embodiments of the disclosure, the light incident from the outside of the electronic device 700 through the recess 730 may be received by the lens unit L of the camera module 705. The surfaces of the portions 731, 732a, 732b, and 732c forming the recesses 730 may fail to have a flat surface during the treating process as described above in the Background Art section. According to an embodiment, the portion 731 of the rear surface of the transparent member 721 forming the recess 730 may have a wrinkled or uneven surface during the manufacturing process. For example, the portion 731 of the rear surface of the transparent member 721 may have marks left on the surface contacting the mold during the manufacturing process, and these marks may be further perceived as the performance of the camera module 705 enhances. According to various embodiments, the masking layers 722a, 722b, and 722c may be formed of different materials, and the surfaces of the plurality of openings 732a, 732b, and 732c forming the recesses 730 may be uneven. The marks formed on the portion 731 of the rear surface of the transparent member 721 or the uneven surface of the plurality of openings 732a, 732b, and 732c may affect the performance (e.g., image quality) of the camera module 705.

The first plate 702 may include a filling member 723 filling the recess 730. The inclusion of the filling member 723 may compensate for the deterioration of the performance (e.g., image quality) of the camera module 705 due to the marks and uneven surface of the recess 730. According to an embodiment, the filling member 723 may be formed of a substantially transparent material. According to various embodiments, the material of the filling member may include an optical clear adhesive material (OCA) or a polymer material. Further, the material of the filling member may include a material having a light transmittance of 90% or more, e.g., a material having a light transmittance of 95% to 100%. According to another embodiment, the material of the filling member may include a material having a light transmittance of approximately 90% (or lower or higher) or higher and a refractive power of approximately 1.5 with respect to the transparent member 1221.

According to one embodiment, the filling member 723 may be formed using a liquid optically clear adhesive material (LOCA), which is a liquid OCA. The filling member 723 using an LOCA may cover the portion 731 of the rear surface of the transparent member 721 while hardened after application and be fixed while covering the inner surface of the plurality of openings 732a, 732b, and 732c formed in the masking layer 722. As the LOCA is used, it is possible to easily add an OCA to the surface of the transparent member having recesses with small widths and to better deal with the uneven surface of the transparent member. After applying the LOCA, it is easy to control the degree of curing by providing ultraviolet (UV), heat, humidity, or other various environments according to the manufacturer's specifications. Further, the portion facing the camera module 705 may be formed flat using the surface tension of the LOCA. Besides, the filling member 723 may be designed to have various degrees of transparency or with various materials according to embodiments.

According to an embodiment, the filling member 723 may be provided in the form of an optical film. The optical film-type filling member 723 may include an adhesive layer adhered to the surface of the transparent member 721 and a non-adhesive layer that is a portion layered on the upper surface of the adhesive layer and facing the camera module 705.

Figure 9:
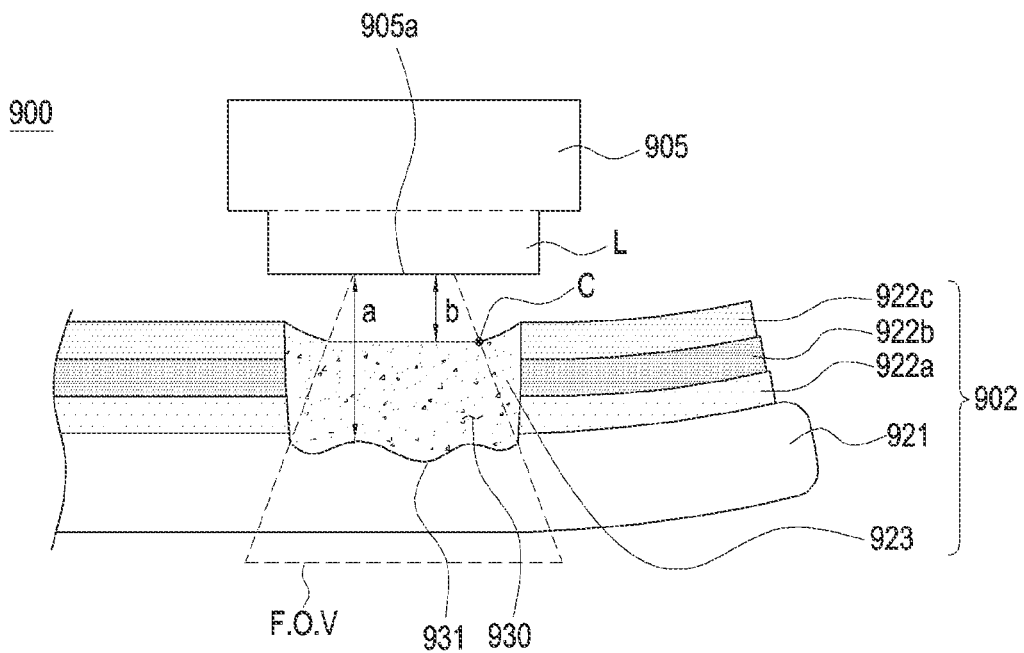
FIG. 9 is a view illustrating a state in which a recess of an electronic device is filled with a filling member according to an embodiment.

FIG. 9 is a view illustrating a state in which a recess 930 of an electronic device 900 is filled with a filling member 923 according to an embodiment.

Referring to FIG. 9, the recess 930 may be formed by a portion 931 of the rear surface of a transparent member 921 and a plurality of openings (e.g., 732a, 732b, 732c of FIG. 7) formed in a plurality of masking layers 922a, 922b, and 922c. According to some embodiments, the filling member 923 may fill and be fixed in the recess 930. In this state, the camera module 905 is disposed in a position corresponding to the recess 930, and the light incident from the outside of the electronic device 900 enters through the imaging surface 905a of the lens unit L to the camera module 905. The performance index of the camera module 905 mounted in the electronic device 900 may be determined by a variety of factors, such as the inherent performance (e.g., resolution) of the imaging device, aberration of the lens, and/or the angle of view (or FOV) of the lens. According to various embodiments of the disclosure, since the filling member 923 fills the recess 930, the field of view (FOV) of the camera module 905 may be set considering the distance a between the imaging surface 905a and the transparent member 921, the distance b between the imaging surface 905a and the filling member 923, and the refractive index of the filling member 923.

If the filling member 923 is hardened in the state where the recess 930 is filled with the LOCA, the filling member 923 may form a flat portion (flatting part) in the central portion and a curved portion (or an un-flatting part) in a portion (edge) adjacent to the side wall of the recess 930 by the effect of surface tension. When the light incident on the first plate 902 passes through the curved portion and then is input to the imaging surface 905a, the image or video obtained through it may be significantly distorted. Thus, the FOV of the camera module 905 is required to be set considering the boundary point c between the flat portion and the curved portion of the filling member 923.

According to some embodiments, the FOV may be increased by increasing the width of the recess 930, but in this case, the recess 930 may be excessively widened. When the recess 930 is excessively widened, the components inside the electronic device may be visually recognized to the outside through the recess 930, thereby deteriorating the aesthetic look of the electronic device 900.

Figure 10:
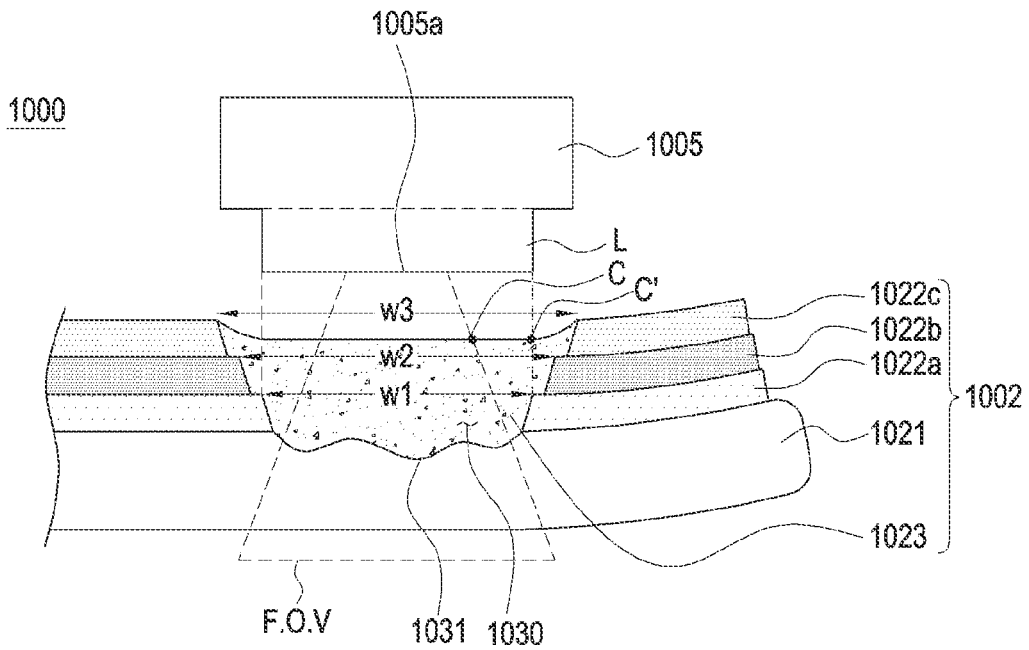
FIG. 10 is a view illustrating a state in which a recess with a step structure is filled with a filling member according to an embodiment of the disclosure.
Figure 11:
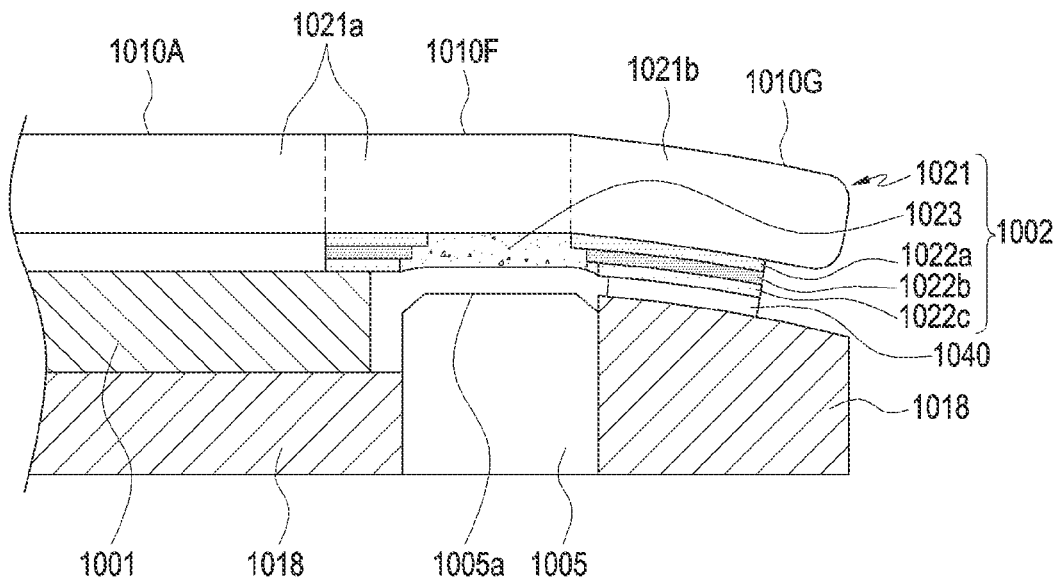
FIG. 11 is a view illustrating a state in which the recess with a step structure illustrated in FIG. 10 is formed on the rear surface of a flat portion of a transparent member.

FIG. 10 is a view illustrating a state in which a filling member 1023 fills a recess 1030 with a step structure according to an embodiment of the disclosure. FIG. 11 is a view illustrating a state in which the recess 1030 with a step structure illustrated in FIG. 10 is formed on the rear surface of the flat portion 1021a of the transparent member 1021, according to an embodiment.

According to an embodiment of the disclosure, an electronic device 1000 may include a display 1001 (e.g., 701 of FIG. 7), a first plate 1002 (e.g., 702 of FIG. 7), a side bezel structure 1018 (e.g., 718 of FIG. 7), and a camera module 1005 (e.g., 705 of FIG. 7).

According to an embodiment, the first plate 1002 may include a recess 1030 having a step structure. The recess 1030 having a step structure may be formed by a portion 1031 of the rear surface of a third region 1010F of the transparent member 1021, a first layer 1022a, a second layer 1022b, and a third layer 1022c. Here, the opening formed in the first layer 1022a may have a first width w1, the opening formed in the second layer 1022b may have a second width w2, and the opening formed in the third layer 1022c may have a third width w3.

When the stepped recess 1030 is filled with a certain amount of the filling member 1023, the filling member 1023 may be formed to be bent at the edge point where it meets the inner wall forming the recess 1030 by the effect of surface tension. For example, as in the embodiment illustrated in FIG. 10, the central portion of the surface of the filling member 1023 facing the lens unit L of the camera module 1005 may be formed substantially flat, but the edge portion of the filling member 1023 may be formed to be curved along the slope of the opening of the third layer 1022c.

The embodiment illustrated in FIG. 10 may be compared with the embodiment illustrated in FIG. 9. The FOVs of the embodiments may be compared under the assumption that both have the same amount of filling member 1023, the same distance (e.g., a of FIG. 9) between the imaging surface 1005a and the transparent member, the same distance (e.g., b of FIG. 9) between the imaging surface 1005a and the filling member 1023, and the same refractive index of filling member 1023.

Referring to FIG. 10, the step structure may be formed so that the third width w3 is larger than the first width w1. The first width w1 may have a width sufficient to cover the components inside the electronic device 1000 considering the aesthetic look of the electronic device 1000. The third width w3 may be formed to be larger than the first width w1. According to an embodiment, additionally, the second width w2 may be set to be larger than the first width w1, and the third width w3 may be set to be larger than the second width w2 and, thus, the step structure may be formed so that the width of the opening increases from the rear surface of the transparent member 1021. Such stepped recess 1030 may be filled with the filling member 1023.

According to the embodiment illustrated in FIG. 10, the filling member 1023 may fill the stepped recess 1030, and according to the embodiment illustrated in FIG. 9, a recess having a substantially constant width in the depth direction may be filled with the filling member 923. The width of the recess 1030 according to the embodiment illustrated in FIG. 10 may be set to be equal to the average width of the recess 930 according to the embodiment illustrated in FIG. 9. The boundary point c' between the flat portion and the curved portion of the filling member 1023 according to the embodiment of FIG. 10 may be positioned farther from the alignment line (e.g., A.L. of FIG. 7) than the boundary point c between the flat portion and the curved portion of the filling member 923 according to the embodiment of FIG. 9. Accordingly, the maximum FOV that may be secured by the electronic device 1000 according to the embodiment illustrated in FIG. 10 may be increased compared to the maximum FOV that may be secured by the electronic device 900 according to the embodiment illustrated in FIG. 9.

According to another embodiment, the size (e.g., the first width w1) of the recess of the electronic device 1000 according to the embodiment illustrated in FIG. 10 may be reduced as compared with the size of the recess of the electronic device 900 according to the embodiment illustrated in FIG. 9, with the maximum FOV of the electronic device 1000 according to the embodiment illustrated in FIG. 10 set to be equal to the maximum FOV of the electronic device according to the embodiment illustrated in FIG. 9. In other words, use of the first plate 1002 including the stepped recess 1030 of FIG. 10 may minimize the size (e.g., the first width w1) of the recess exposed to the outside, as compared with the embodiment of the first plate which does not include a stepped recess.

FIG. 11 schematically illustrates an internal configuration of an electronic device including a first plate 1002 in which a stepped recess 1030 is formed. Referring to FIG. 11, a plurality of masking layers 1022a, 1022b, and 1022c may be formed on the rear surface of the transparent member 1021, and a filling member 1023 may fill the opening formed in the masking layers 1022a, 1022b, and 1022c.

According to an embodiment, the display 1001 may be in tight contact with at least a portion of the rear surface of the third layer 1022c among the plurality of masking layers 1022a, 1022b, and 1022c. Further, as described above, a boundary between the opaque region and the transparent region of the first plate 1002 may be set through the first layer 1022a. The user may be provided with visual information, such as text, images, videos, icons, or symbols through the transparent region of the first plate 1002. The screen output from the display 1001 may be displayed to the outside through the first surface 1010A of the first plate 1002. As the second layer 1022b is provided, the light output through the front surface of the display 1001 may be prevented from leaking to the side of the electronic device 1000.

The camera module 1005 may be disposed where the imaging surface 1005a faces the filling member 1023 and the imaging surface 1005a is spaced apart from the filling member 1023 by a predetermined distance. As the imaging surface 1005a does not directly contact but is rather spaced apart from the filling member 1023, the lens unit L provided in the camera module 1005 may be protected from the risk of damage. The camera module 1005 may be disposed parallel to a horizontal direction parallel to the surface of the transparent member 1021, along with the display 1001, inside the electronic device 1000. Further, as the masking layers 1022a, 1022b, and 1022c that block the traveling path of light are provided between the camera module 1005 and the display 1001, the display 1001 may be prevented from exposure to the light incident through the recess 1030.

The side bezel structure 1018 may provide a mounting space for the display 1001 and the camera module 1005. In addition to the camera module 1005, other various electronic components including a sensor module (e.g., 176 of FIG. 1), a battery (e.g., 189 of FIG. 1) and/or a printed circuit board (e.g., 340 of FIG. 4) may be mounted on the side bezel structure 1018, but no description thereof is given herein for convenience of description.

According to various embodiments, the electronic device 1000 may include at least one adhesive layer 1040. The adhesive layer 1040 according to the embodiments illustrated in FIG. 11 may be disposed between the first plate 1002 and the side bezel structure 1018. More specifically, the adhesive layer 1040 may be disposed between the third layer 1022c and the side bezel structure 1018. The electronic device 1000 may include the adhesive layer 1040 to absorb shocks and/or implement a waterproof/dustproof function. The adhesive layer 1040 may include, e.g., a liquid adhesive material, such as a glue, or an adhesive material, such as a double-sided tape.

According to various embodiments, the adhesive layer 1040 may additionally or alternatively be provided in other positions within the electronic device 1000, e.g., between the display 1001 and the transparent member 1021, between the display 1001 and the battery (e.g., 350 of FIG. 4), or between the display 1001 and the housing (e.g., 310 of FIG. 3). The adhesive layer 1040 may be formed in other various positions.

In various embodiments of the disclosure, at least a portion of the masking layers 1022a, 1022b, and 1022c may be formed on the rear surface of the curved portion 1021b of the transparent member 1021. For example, referring to FIG. 11, a portion of the plurality of masking layers 1022a, 1022b, and 1022c may be formed on the rear surface of the flat portion 1021a of the transparent member 1021, and another portion thereof may be formed on the rear surface of the curved portion 1021b of the transparent member 1021. According to some embodiments, as at least a portion of the masking layers is formed on the curved surface, the probability that the region where the recess 1030 is formed in the rear surface of the transparent member 1021 is wrinkled and uneven may increase. This may lower the resolution of the camera module 1005. According to various embodiments of the disclosure, as the recess 1030 is filled with the filling member 1023, it is possible to prevent deterioration of the resolution of the camera module 1005. Further, as in the embodiment illustrated in FIGS. 10 and 11, as the stepped recess 1030 is filled with the filling member 1023, the area of the flat portion in the surface where the filling member 1023 faces the camera module 1005 and is exposed may be increased, so that the FOV may be enhanced.

According to the embodiments illustrated in FIGS. 10 and 11, as an electronic component facing the recess 1030, a camera module has been exemplified, but it should be noted that without limitations thereto, a receiver (or speaker) module, a sensor module (e.g., an IR sensor module) or other various modules may be added or replace it.

Figure 12:
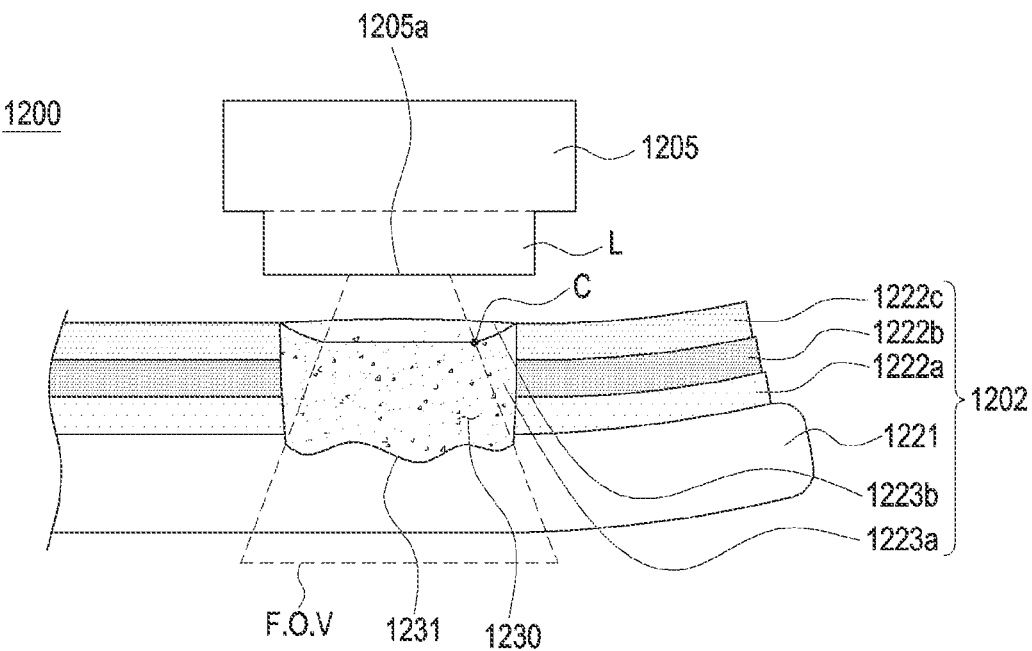
FIG. 12 is a view illustrating a state in which a recess is double filled with a filling member according to an embodiment of the disclosure.
Figure 13:
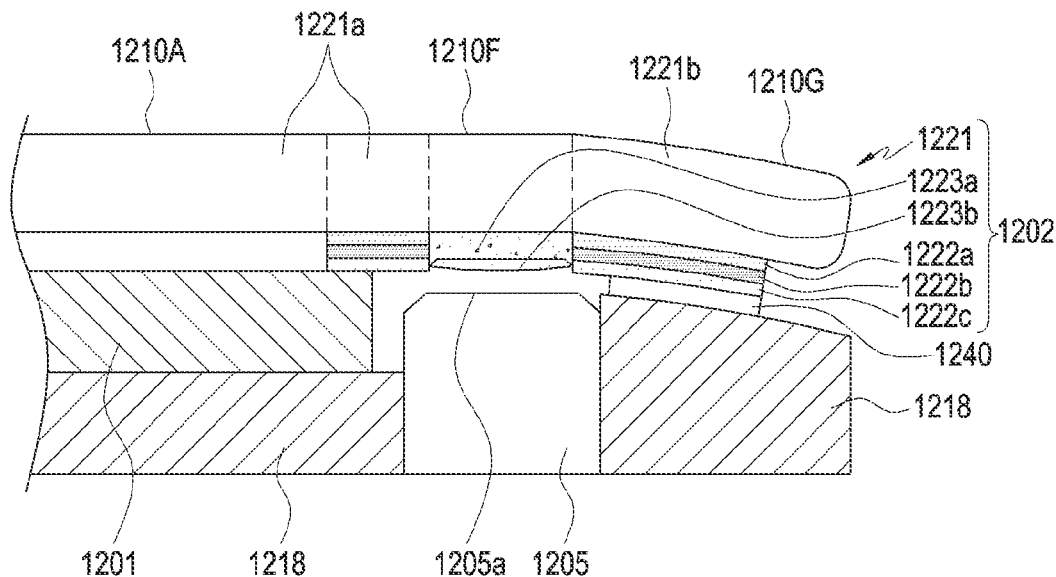
FIG. 13 is a view illustrating a state in which the recess illustrated in FIG. 12 is formed on the rear surface of a flat portion of a transparent member, according to an embodiment.

FIG. 12 is a view illustrating a state in which a recess 1230 is double filled with filling members 1223a and 1223b according to an embodiment of the disclosure. FIG. 13 is a view illustrating a state in which the recess 1230 illustrated in FIG. 12 is formed on the rear surface of the flat portion 1221a of the transparent member 1221, according to an embodiment.

No duplicate description is given below in connection with various embodiments of the disclosure.

According to an embodiment of the disclosure, an electronic device 1200 may include a display 1201 (e.g., 701 of FIG. 7), a first plate 1202 (e.g., 702 of FIG. 7), a side bezel structure 1218 (e.g., 718 of FIG. 7), and a camera module 1205 (e.g., 705 of FIG. 7).

Referring to FIGS. 12 and 13 together, the first plate 1202 may include filling members that double-fill he recess 1230. To enhance the flatness of all the filling members and increase the transmittance of light, the electronic device 1200 according to the embodiment illustrated in FIGS. 12 and 13 may include two different filling members 1223a and 1223b that fill the recess 1230. The first filling member 1223a and the second filling member 1223b may be formed of different materials. For example, the first filling member 1223a may be formed of a hydrophilic material, and the second filling member 1223b may be formed of a hydrophobic material.

According to this embodiment, the first filling member 1223a may contact the amorphous surface of the transparent member 1231 in the recess 1230, and the second filling member 1223b may be stacked on the first filling member 1223a and face the camera module 1205.

If the first filling member 1223a is formed of a hydrophilic material, when contacting the amorphous surface of the transparent member 1231 in the recess 1230, the first filling member 1223a may be inserted through the gap of the amorphous surface and attached.

The second filling member 1223b may fill the space on the upper surface of the first filling member 1223a. If the second filling member 1223b is stacked on the first filling member 1223a, one surface of the second filling member 1223b may face the transparent member 1221, and the opposite surface of the second filling member 1223b may face the imaging surface 1205a of the camera module 1205. Here, the second filling member 1223b may be formed to contact, or not to contact, the opaque masking layers in the recess 1230.

According to an embodiment, the second filling member 1223b may have the same optical characteristics as the first filling member 1223a. According to an embodiment, since the second filling member 1223b may be provided in addition to the first filling member 1223a and combined with the first filling member 1223a, at least, the optical characteristics may be enhanced as compared with the embodiment in which only the first filling member 1223a is provided.

According to the embodiments illustrated in FIGS. 12 and 13, the second filling member 1223b different from the first filling member 1223a may further be included, and the recess 1230 is filled with them, so that the concave portion of the upper surface of the first filling member 1223a may be made flatter. According to this embodiment, the FOV may be increased without increasing the width of the recess 1230.

Figure 14:
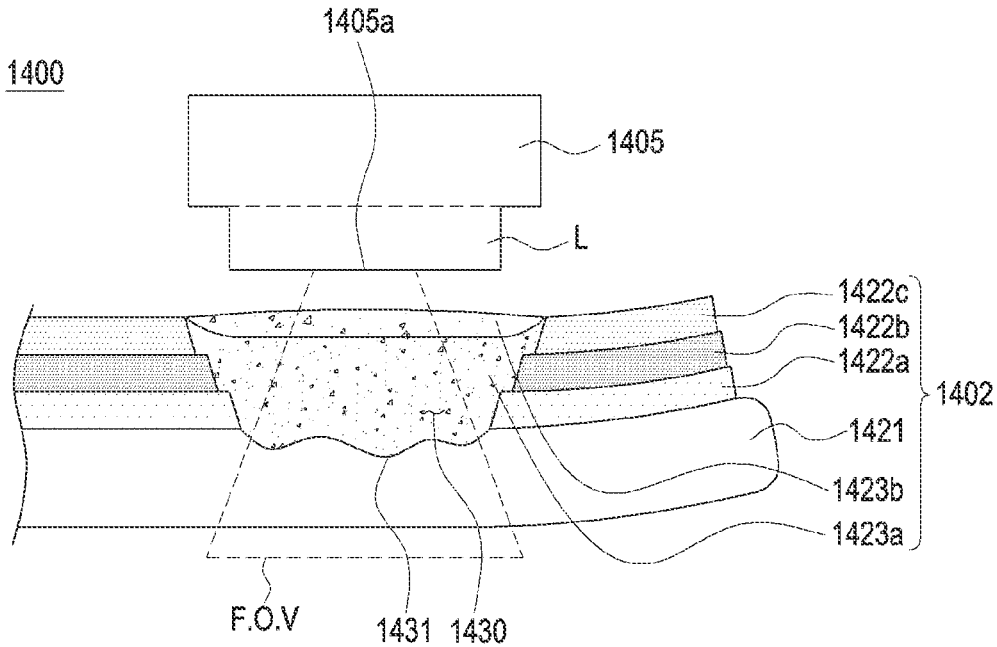
FIG. 14 is a view illustrating a state in which a recess with a step structure is double filled with a filling member according to an embodiment of the disclosure.
Figure 15:
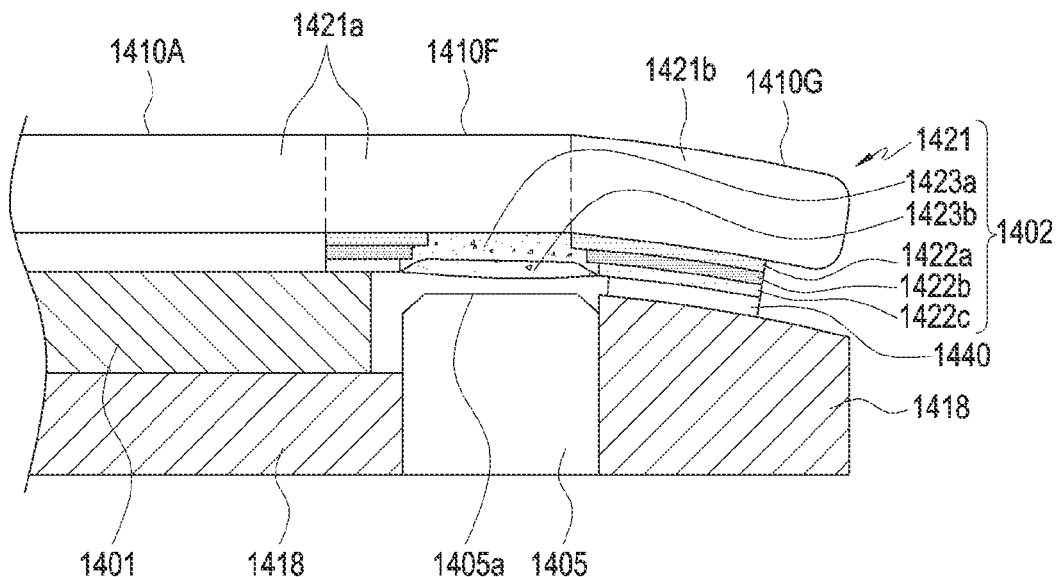
FIG. 15 is a view illustrating a state in which the recess illustrated in FIG. 14 is formed on the rear surface of a flat portion of a transparent member, according to an embodiment.

FIG. 14 is a view illustrating a state in which a stepped recess 1430 is double filled with filling members 1423a and 1423b according to an embodiment of the disclosure. FIG. 15 is a view illustrating a state in which the recess 1430 illustrated in FIG. 14 is formed on the rear surface of the flat portion 1421a of the transparent member 1421, according to an embodiment.

An embodiment in which the stepped recess 1030 is filled with one type of filling member 1023 has been described in connection with FIGS. 10 and 11, and an embodiment in which the recess 1230 is filled with two types of filling members 1223a and 1223b has been described in connection with FIGS. 12 and 13.

In contrast, FIGS. 14 and 15 disclose an embodiment of an electronic device 1400 in which the embodiments illustrated in FIGS. 10 to 13 are combined so that a stepped recess 1430 is double filled with filling members 1423a and 1423b.

Referring to FIGS. 14 and 15, as the filling members 1423 fill the stepped structure 1430, a sufficient area may be secured of the flat portion in the surface where the filling members 1423 are exposed facing the camera module 1405, thus enhancing the FOV. Further, the second filling member 1423b different from the first filling member 1423a may be further included and be used to fill the recess 1430, so that the concave portion of the upper surface of the first filling member 1423a may be made flatter. According to this embodiment, the FOV may be increased without increasing the width of the recess 1430.

Figure 16:
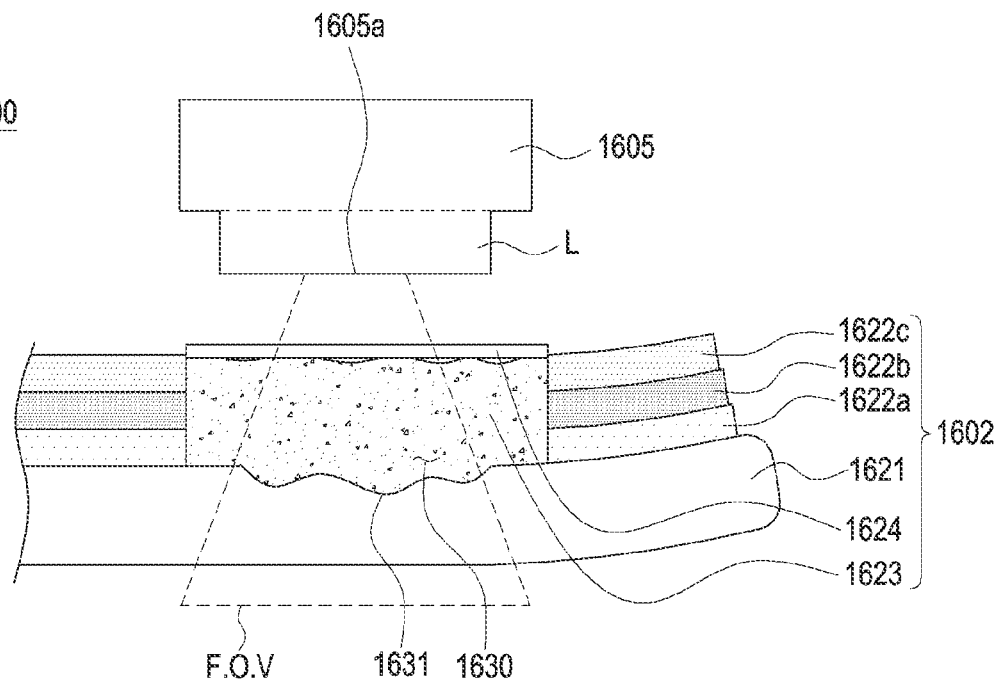
FIG. 16 is a view illustrating a state in which a recess is filled with a filling member, and a second transparent member is disposed according to an embodiment of the disclosure.
Figure 17:
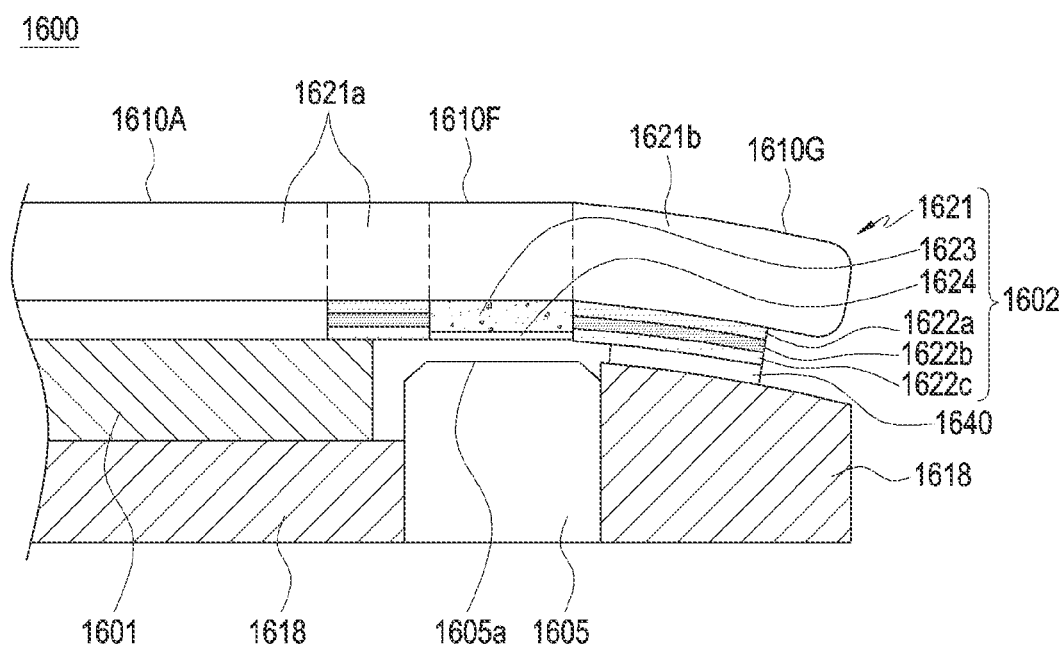
FIG. 17 is a view illustrating a state in which the recess illustrated in FIG. 16 is formed on the rear surface of a flat portion of a transparent member.

FIG. 16 is a view illustrating a state in which a recess 1630 is filled with a filling member 1623, and a second transparent member 1624 is disposed according to an embodiment of the disclosure. FIG. 17 is a view illustrating a state in which the recess 1630 illustrated in FIG. 16 is formed on the rear surface of the flat portion 1621a of the transparent member 1621.

According to an embodiment of the disclosure, an electronic device 1600 may include a display 1601 (e.g., 701 of FIG. 7), a first plate 1602 (e.g., 702 of FIG. 7), a side bezel structure 1618 (e.g., 718 of FIG. 7), and a camera module 1605 (e.g., 705 of FIG. 7).

Referring to FIGS. 16 and 17 together, the first plate 1602 may include a filling member 1623 filling a recess 1630 and may further include a second transparent member 1624.

According to some embodiments, the thickness of the filling member 1623 may be very small. In such a case, a method for increasing the FOV may be considered by additionally including the second transparent member 1624.

According to an embodiment, the second transparent member 1624 may be formed in substantially the same configuration as the first transparent member 1621. The thickness of the second transparent member 1624 may be formed to be smaller than the distance between the imaging surface 1605a of the camera module and the filling member 1623. For example, the thickness of the second transparent member 1624 may be set to 50 μm and may be formed to be very thin compared to the first transparent member 1621. For example, the second transparent member 1624 may be provided in the form of a film.

According to an embodiment, since the filling member 1623 is formed of an LOCA, its surface may be uneven. By attaching the second transparent member 1624 to the upper surface of the filling member 1623, the surface of the filling member 1623 may be homogenized and flattened. Thus, the FOV may be increased.

Figure 18:
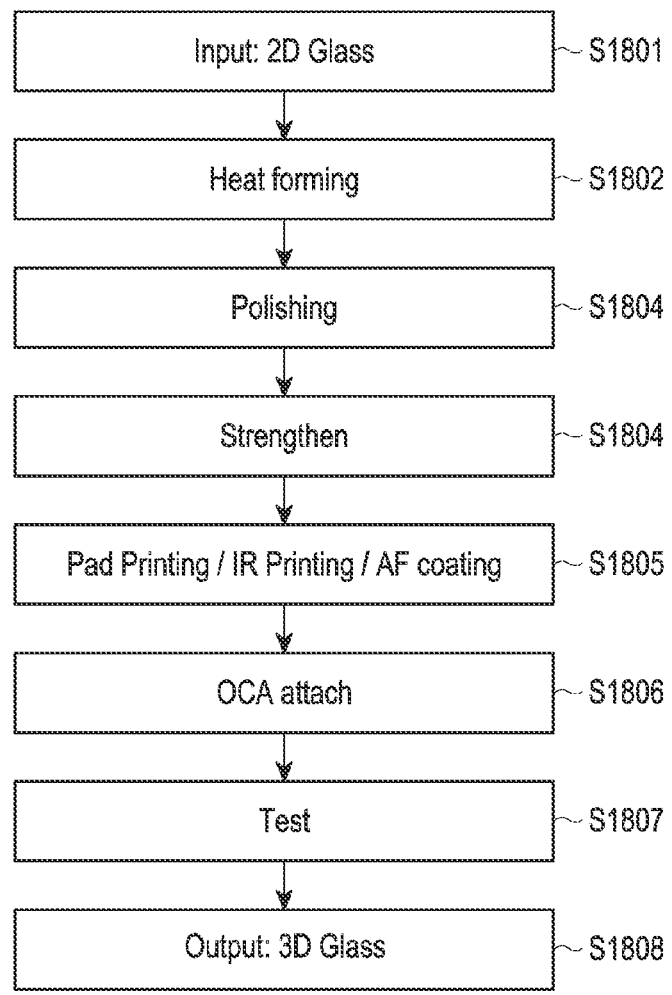
FIG. 18 is a view illustrating a method for manufacturing a first plate according to the embodiments illustrated in FIGS. 10 to 17.

FIG. 18 is a view illustrating a method for manufacturing a first plate 1002, 1202, 1402, or 1602 according to the embodiments (or first embodiment) illustrated in FIGS. 10 to 17. FIG. 18 may illustrate a method for manufacturing a transparent member (e.g., 3D GLASS) including a curved portion by inserting a flat transparent member (e.g., 2D GLASS) into a high-temperature thermoforming device.

First, a flat transparent member (e.g., 2D GLASS) may be prepared (operation 1801).

To form the flat transparent member (e.g., 2D GLASS) into a transparent member (e.g., 3D GLASS) including a curved portion, the flat transparent member (e.g., 2D GLASS) may be thermoformed (operation 1802). In the thermoforming operation, the surface of the transparent member (e.g., 2D GLASS) may come into direct contact with the mold under high temperature and high pressure, and accordingly, the surface may be worn, partially leaving irregular marks due to contact with the mold. In particular, in the process of forming the flat portion (hereinafter referred to as a 'flat portion') into a curved portion (hereinafter referred to as a 'curved portion'), many marks may remain. The light incident through the curved portion may be excessively refracted or reflected by the marks, and thus visual information (e.g., images or videos) input to the camera sensor of the camera module through the camera aperture may be distorted.

After the thermoforming process (operation 1802), the surface of the transparent member including the curved portion may be smoothed through polishing (operation 1803).

Further, a process for strengthening the surface (operation 1804) may be performed to make the transparent member more rigid. In this case, at least one or more chemical substances may be used to reinforce the surface of the transparent member. According to an embodiment, any one of the polishing and reinforcing processes may be selectively performed, or all of the processes may be omitted.

A pad printing process (operation 1805) may be performed to form an opaque masking region. According to an embodiment, three types of inks may be sequentially printed to form the first to third masking layers. Further, an IR printing process for covering the SVC lead and sensor hole positions using a specific type of ink, and an AF coating process for coating the outside of the transparent member to prevent fingerprints from remaining on the surface of the transparent member may be performed.

When forming the opaque masking region, a recess may be formed considering the direction in which the imaging surface of the camera module faces. If the recess is formed, the recess may be filled with a filling member (e.g., OCA).

According to various embodiments, various tests 1807 may be performed on the transparent member that has undergone the above-described processes (e.g., operations 1801 to 1806). Here, the tests may include at least one of, e.g., an SFR test, a vinyl, and QR code test.

The electronic devices 1000, 1200, 1400, and 1600 in which the recesses 1030, 1230, 1430, and 1630 are formed in the rear surfaces of the flat portions 1021a, 1221a, 1421a, and 1621a of the transparent members 1021, 1221, 1421, and 1621 have been described above in connection with the embodiments illustrated in FIGS. 10 to 17.

First plates 1902, 2002, 2102, 2202, and 2302 according to embodiments different from the above-described embodiment illustrated in FIGS. 10 to 17 are described below with reference to FIGS. 19 to 23.

Figure 19:
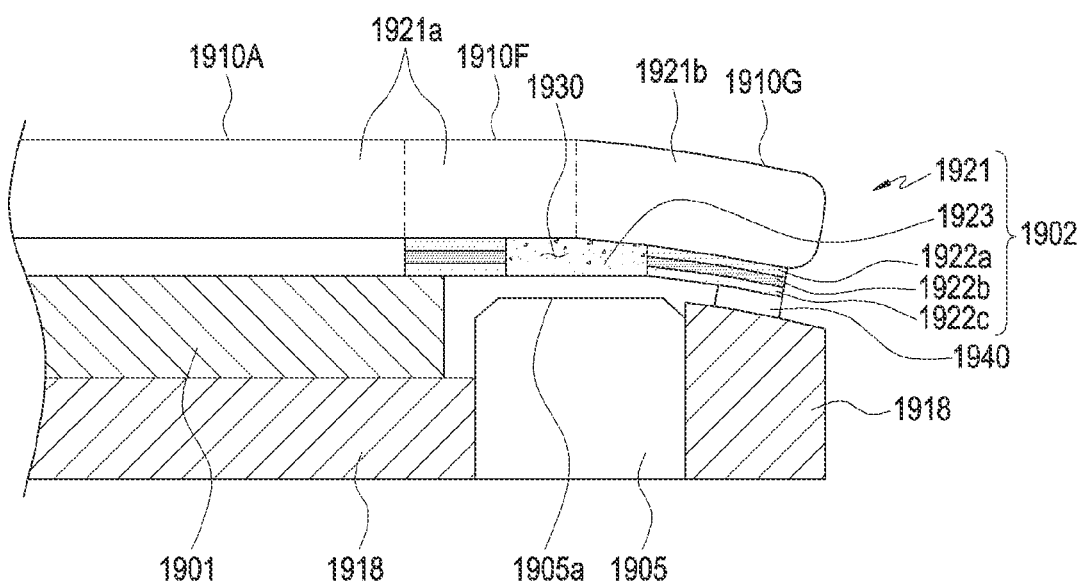
FIG. 19 is a view illustrating a state in which a recess and a filling member are formed on the rear surface of a flat portion and a curved portion of a transparent member according to an embodiment.

FIG. 19 is a view illustrating a state in which a recess 1930 and a filling member 1923 are formed on the rear surfaces of a flat portion 1921a and curved portion 1921b of a transparent member 1921, according to an embodiment.

According to various embodiments of the disclosure, at least a portion of the masking layers (e.g., 1922a, 1922b, and 1922c) may be formed on the rear surface of the curved portion (e.g., 1921b) of the transparent member (e.g., 1921). Accordingly, at least a portion of the recess (e.g., 1930) may be formed in the curved portion (e.g., 1921b).

Referring to FIG. 19, a portion of the plurality of masking layers 1922a, 1922b, and 1922c may be formed on the rear surface of the flat portion 1921a of the transparent member 1921, and another portion thereof may be formed on the rear surface of the curved portion 1921b of the transparent member 1921. According to some embodiments, as at least a portion of the masking layers is formed on the curved surface, the probability that the region where the recess 1930 is formed in the rear surface of the transparent member 1921 is wrinkled and uneven may increase. This may lower the resolution of the camera module 1905. According to various embodiments of the disclosure, as the recess 1930 is filled with the filling member 1923, it is possible to prevent deterioration of the resolution of the camera module 1905. However, in the embodiment illustrated in FIG. 19, since the region in which the recess 1930 is formed exists at the boundary between the flat portion 1921a and the curved portion 1921b, the state of the lower surface of the transparent member 1921 may be more uneven than in the embodiment where the region in which the recess 1930 is formed is formed only in the rear surface of the flat portion (e.g., the embodiments illustrated in FIGS. 11, 13, 15, and 17).

Figure 20:
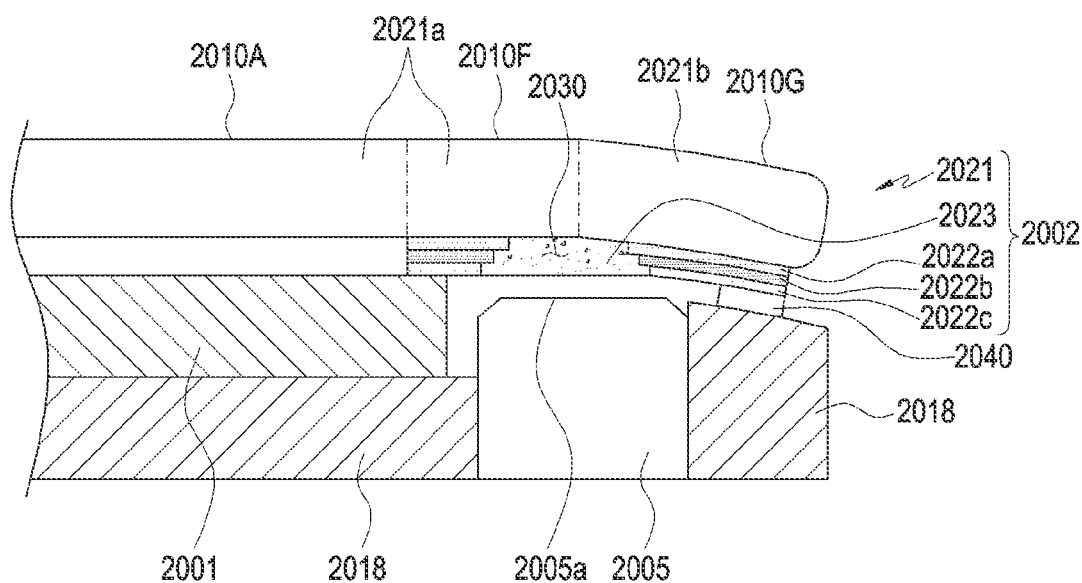
FIG. 20 is a view illustrating a state in which a recess with a step structure is formed on the rear surface of a flat portion and a curved portion of a transparent member according to another embodiment of the disclosure.

FIG. 20 is a view illustrating a state in which a stepped recess 2030 is formed on the rear surface of a flat portion 2021a and a curved portion 2021b of a transparent member 2021 according to another embodiment of the disclosure.

Referring to FIG. 20, as the stepped recess 2030 is filled with the filling member 2023, the area of the flat portion in the surface where the filling member 2023 faces the camera module 2005 and is exposed may be increased, so that the FOV may be enhanced.

Figure 21:
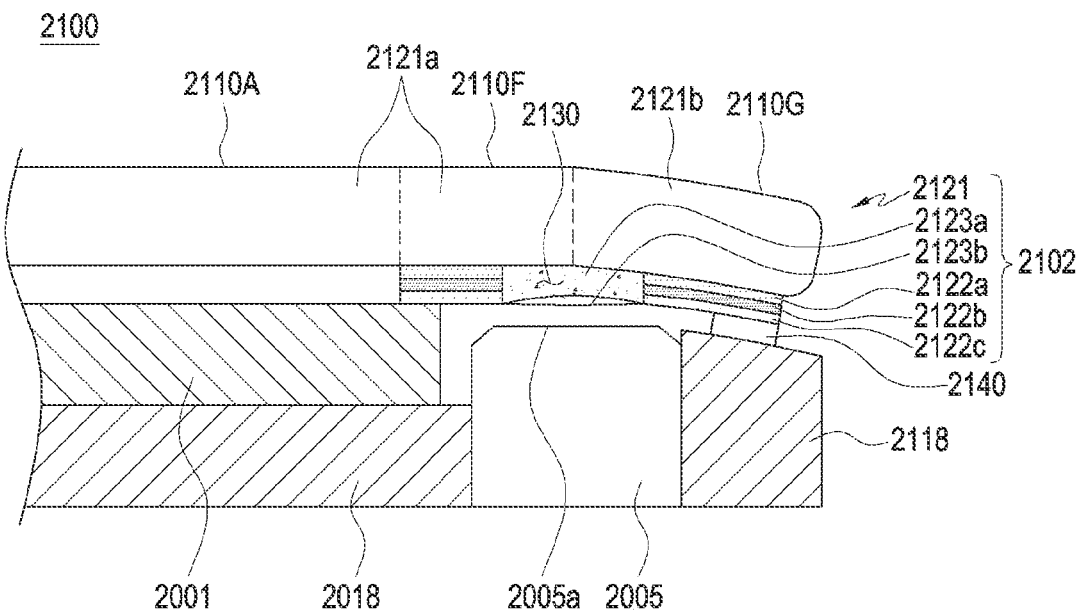
FIG. 21 is a view illustrating a state in which a recess and a filling member double-filling the recess are formed on the rear surface of a flat portion and a curved portion of a transparent member according to another embodiment of the disclosure.

FIG. 21 is a view illustrating a state in which a recess 2130 and a filling member 2130 double-filling the recess 2130 are formed on the rear surface of a flat portion 2121a and a curved portion 2121b of a transparent member 2121 according to another embodiment of the disclosure.

Referring to FIG. 21, the second filling member 2123b different from the first filling member 2123a may further be included, and the recess 2130 is filled with them, so that the concave portion of the upper surface of the first filling member 2123a may be made flatter. According to this embodiment, the FOV may be increased without increasing the width of the recess 2130.

Figure 22:
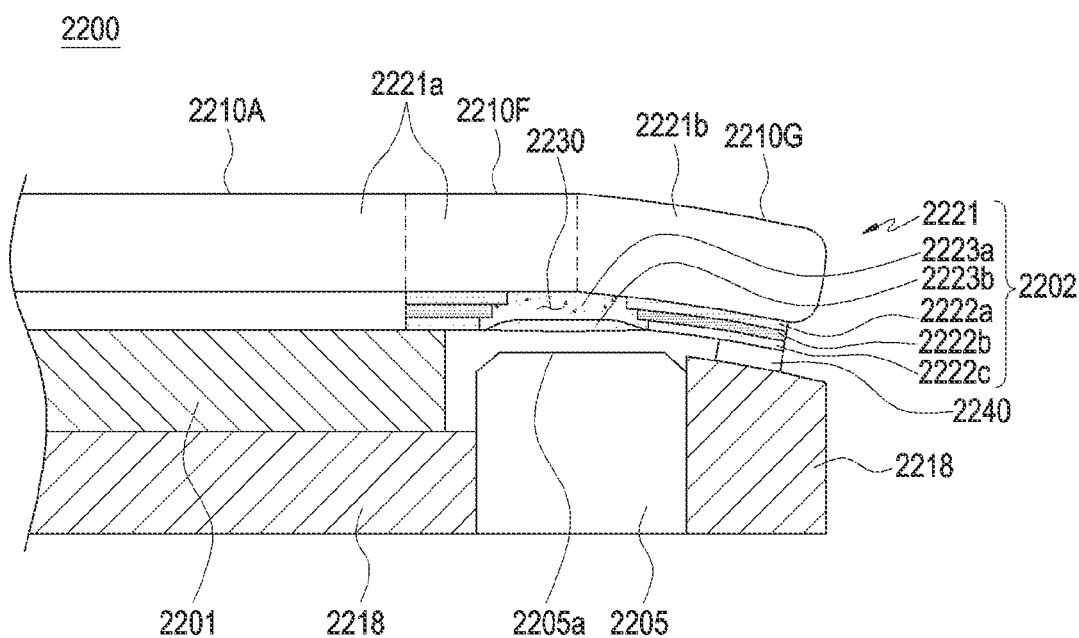
FIG. 22 is a view illustrating a state in which a recess with a step structure and a filling member double-filling the recess are formed on the rear surface of a flat portion and a curved portion of a transparent member according to another embodiment of the disclosure.

FIG. 22 is a view illustrating a state in which a stepped recess 2230 and a filling member 2230 double-filling the recess 2230 are formed on the rear surface of a flat portion 2221a and a curved portion 2221b of a transparent member 2221 according to another embodiment of the disclosure.

Referring to FIG. 22, as the stepped recess 2230 is filled with the filling member, a sufficient area of the flat portion in the surface where the filling member faces the camera module 2205 and is exposed may be secured, enhancing the FOV. As the filling members, the first filling member 2223a and the second filling member 2223b different from the first filling member 2223a may further be included, and the recess 2230 may be filled with them, so that the concave portion of the upper surface of the first filling member 2223a may be made flatter. According to this embodiment, the FOV may be increased without increasing the width of the recess 2230.

Figure 23:
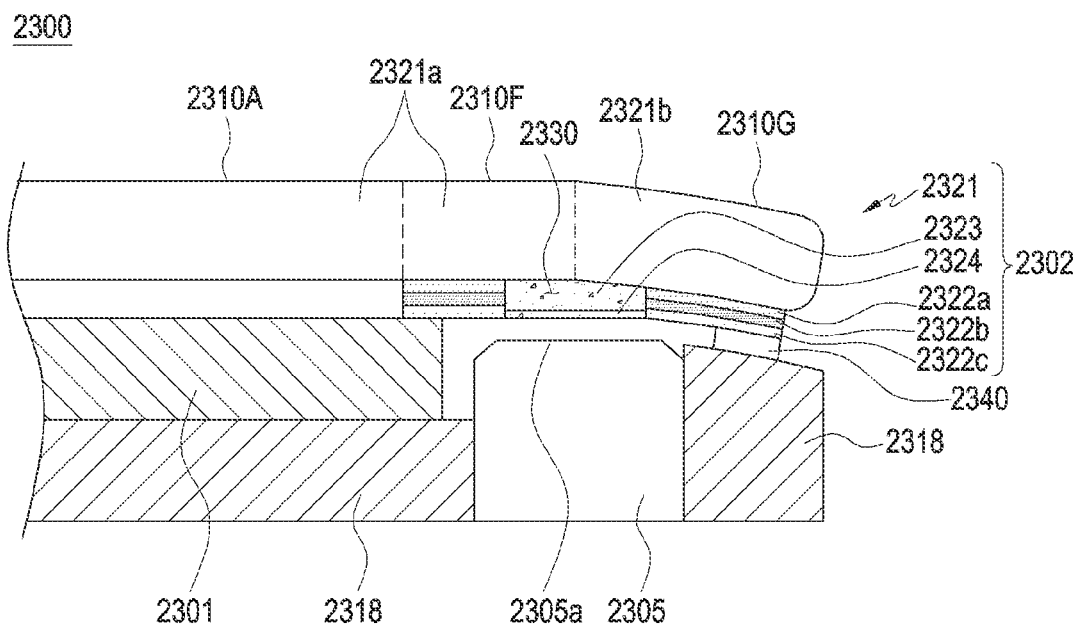
FIG. 23 is a view illustrating a state in which a recess, a filling member filling the recess, and a second transparent member are formed on the rear surface of a flat portion and a curved portion of a transparent member, according to another embodiment of the disclosure.

FIG. 23 is a view illustrating a state in which a recess 2330, a filling member 2323 filling the recess 2330, and a second transparent member 2324 are formed on the rear surface of a flat portion 2321a and curved portion 2321b of a transparent member 2321 according to another embodiment of the disclosure.

Referring to FIG. 23, since the filling member 2323 is formed of an LOCA, its surface may be uneven. By attaching the second transparent member 2324 to the upper surface of the filling member 2323, the surface of the filling member 2323 may be homogenized and flattened. Thus, the FOV may be increased.

According to various embodiments of the disclosure, embodiments of the stepped recesses 2030 and 2230, the double filling members 2123a and 2123b, 2223a and 2223b, and the second transparent member 2324 are disclosed, and various methods for increasing the FOV under limited conditions may be provided.

First plates 2402, 2502, 2602, 2702, and 2802 according to embodiments different from the above-described embodiment illustrated in FIGS. 10 to 17 are described below with reference to FIGS. 24 to 28.

Figure 24:
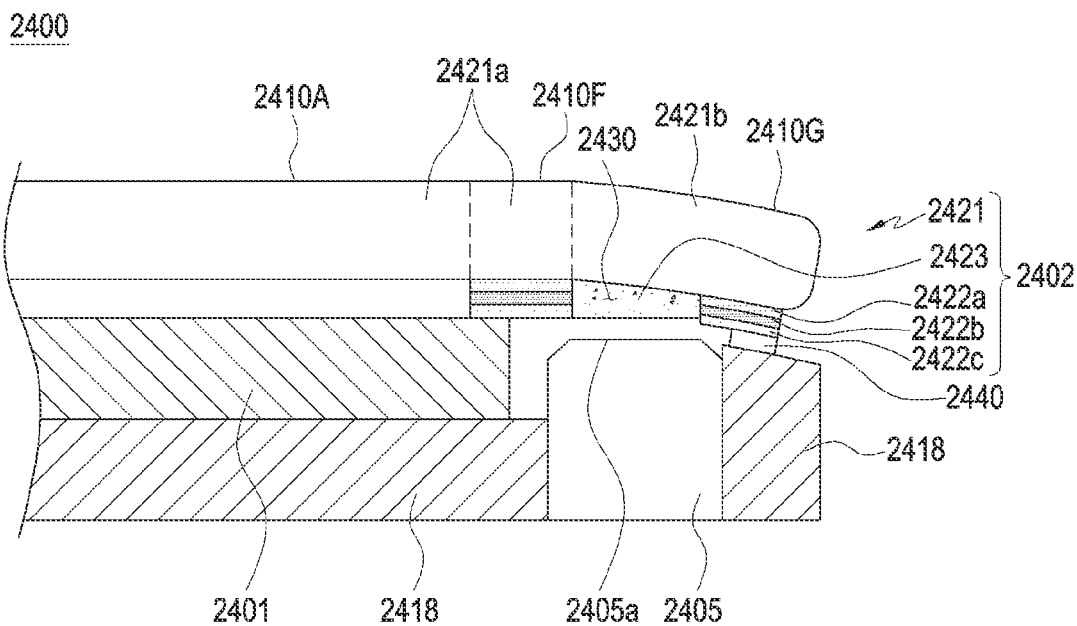
FIG. 24 is a view illustrating a state in which a recess and a filling member are formed on the rear surface of a curved portion of a transparent member according to an embodiment.

FIG. 24 is a view illustrating a state in which a recess 2430 and a filling member 2423 are formed on the rear surface of a curved portion 2421b of a transparent member 2421, according to an embodiment.

According to various embodiments of the disclosure, at least a portion of the masking layers (e.g., 2422a, 2422b, and 2422c) may be formed on the rear surface of the curved portion (e.g., 12921b) of the transparent member (e.g., 2421). According to an embodiment, the entire recess (e.g., 2430) may be formed on the curved portion (e.g., 2421b).

Referring to FIG. 24, a portion of the plurality of masking layers 2422a, 2422b, and 2422c may be formed on the rear surface of the flat portion 2421a of the transparent member 2421, and another portion thereof may be formed on the rear surface of the curved portion 2421b of the transparent member 2421. According to some embodiments, as at least a portion of the masking layers is formed on the curved surface, the probability that the region where the recess 2430 is formed in the rear surface of the transparent member 2421 is wrinkled and uneven may increase. This may lower the resolution of the camera module 2405. According to various embodiments of the disclosure, as the recess 2430 is filled with the filling member 2423, it is possible to prevent deterioration of the resolution of the camera module 2405. However, in the embodiment illustrated in FIG. 24, since the region in which the recess 2430 is formed exists on the curved portion 2421b, the state of the lower surface of the transparent member 2421 may be more uneven than in the embodiment where the region in which the recess 2430 is formed is formed only in the rear surface of the flat portion (e.g., the embodiments illustrated in FIGS. 11, 13, 15, and 17). The state of the lower surface of the transparent member 2421 according to the embodiment of FIG. 24 may be more uneven than the state of the lower surface of the transparent member 1921 according to the embodiment of FIG. 19.

Figure 25:
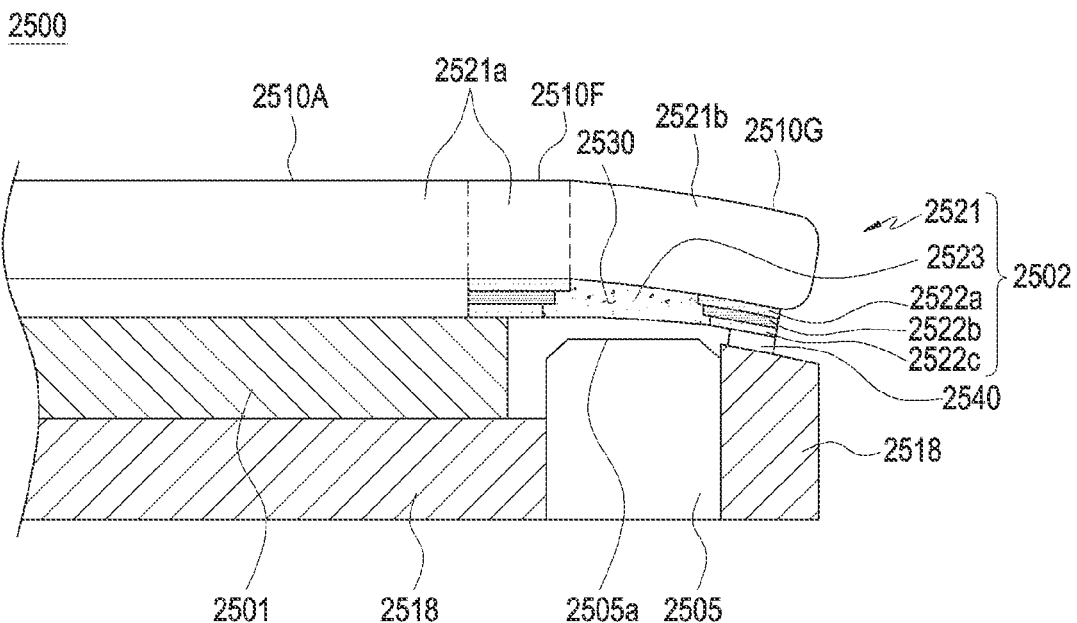
FIG. 25 is a view illustrating a state in which a recess with a step structure is formed on the rear surface of a curved portion of a transparent member according to another embodiment of the disclosure.

FIG. 25 is a view illustrating a state in which a stepped recess 2530 is formed on the rear surface of a curved portion 2521b of a transparent member 2521 according to another embodiment of the disclosure.

Referring to FIG. 25, as the stepped recess 2530 is filled with the filling member 2523, the area of the flat portion in the surface where the filling member 2523 faces the camera module 2505 and is exposed may be increased, so that the FOV may be enhanced.

Figure 26:
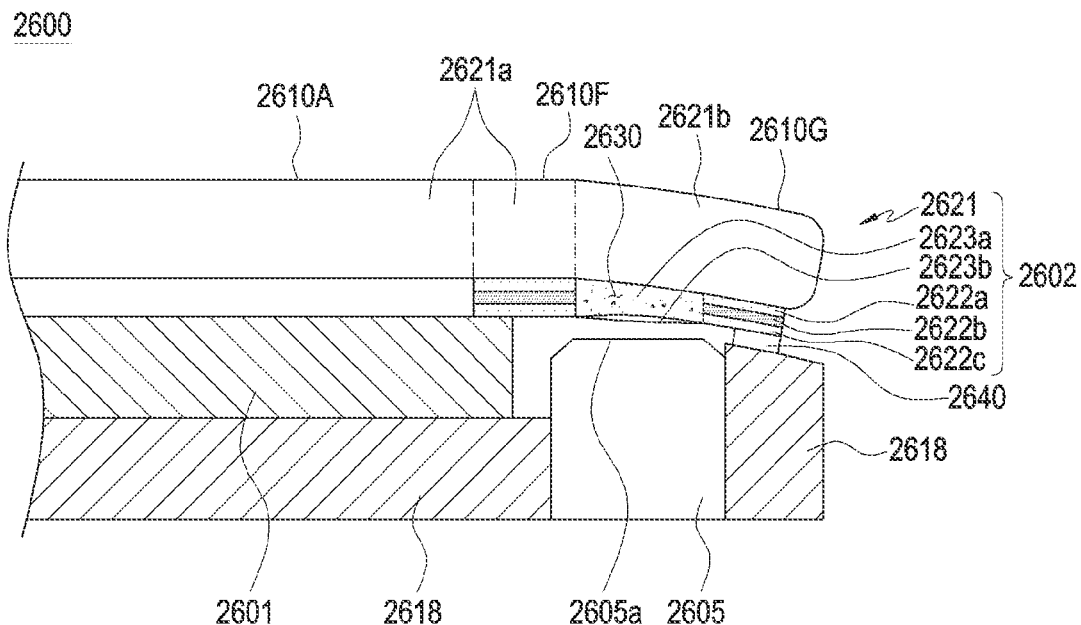
FIG. 26 is a view illustrating a state in which a recess and a filling member double-filling the recess are formed on the rear surface of a curved portion of a transparent member according to another embodiment of the disclosure.

FIG. 26 is a view illustrating a state in which a recess 2630 and a filling member 2630 double-filling the recess 2630 are formed on the rear surface of a curved portion 2621b of a transparent member 2621 according to another embodiment of the disclosure.

Referring to FIG. 26, the second filling member 2623b different from the first filling member 2623a may further be included, and the recess 2630 is filled with them, so that the concave portion of the upper surface of the first filling member 2623a may be made flatter. According to this embodiment, the FOV may be increased without increasing the width of the recess 2630.

Figure 27:
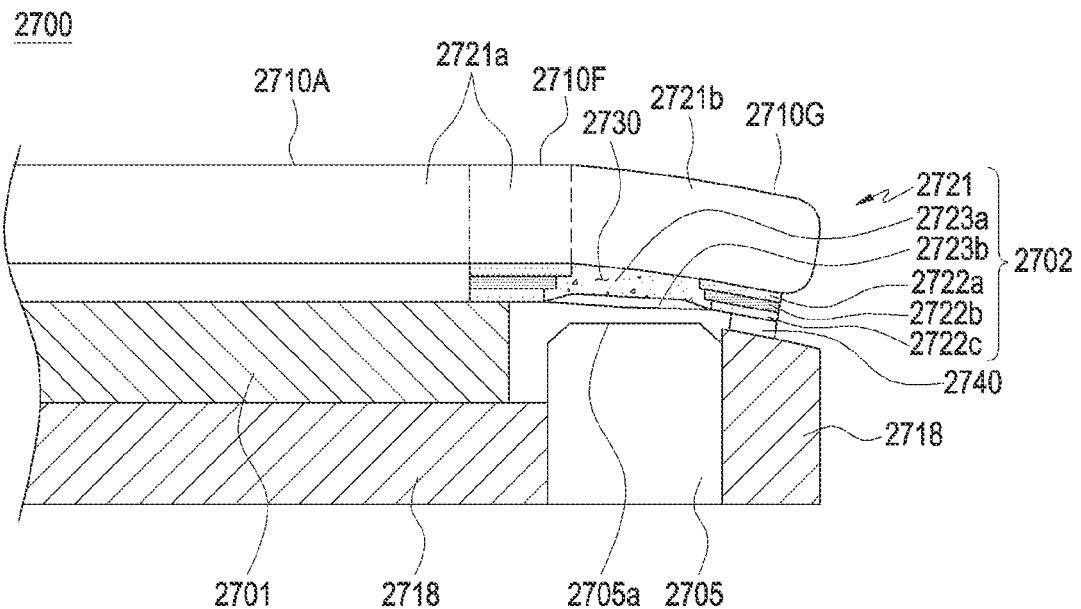
FIG. 27 is a view illustrating a state in which a recess with a step structure and a filling member double-filling the recess are formed on the rear surface of a curved portion of a transparent member according to another embodiment of the disclosure.

FIG. 27 is a view illustrating a state in which a stepped recess 2730 and a filling member 2730 double-filling the recess 2730 are formed on the rear surface of a curved portion 2721b of a transparent member 2721 according to another embodiment of the disclosure.

Referring to FIG. 27, as the stepped recess 2730 is filled with the filling member, a sufficient area of the flat portion in the surface where the filling member faces the camera module 2705 and is exposed may be secured, enhancing the FOV. As the filling members, the first filling member 2723a and the second filling member 2723b different from the first filling member 2723a may further be included, and the recess 2730 may be filled with them, so that the concave portion of the upper surface of the first filling member 2723a may be made flatter. According to this embodiment, the FOV may be increased without increasing the width of the recess 2730.

Figure 28:
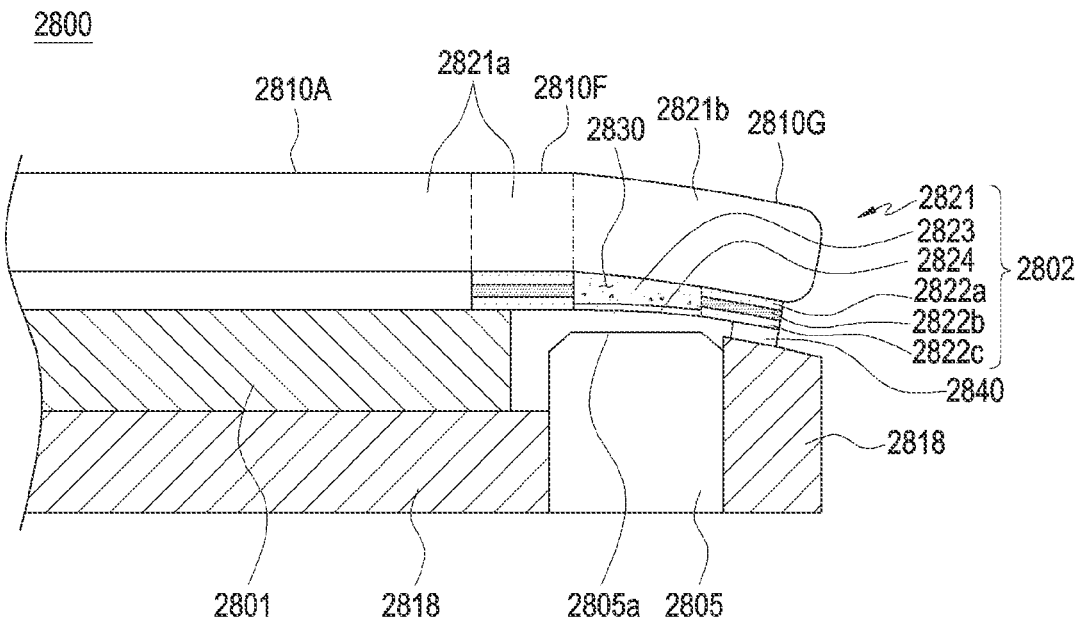
FIG. 28 is a view illustrating a state in which a recess, a filling member filling the recess, and a second transparent member are formed on the rear surface of a curved portion of a transparent member, according to another embodiment of the disclosure.

FIG. 28 is a view illustrating a state in which a recess 2830, a filling member 2823 filling the recess 2830, and a second transparent member 2824 are formed on the rear surface of a curved portion 2821b of a transparent member 2821 according to another embodiment of the disclosure.

Referring to FIG. 28, since the filling member 2823 is formed of an LOCA, its surface may be uneven. By attaching the second transparent member 2824 to the upper surface of the filling member 2823, the surface of the filling member 2823 may be homogenized and flattened. Thus, the FOV may be increased.

According to various embodiments of the disclosure, embodiments of the stepped recesses 2030 and 2230, the double filling members 2123a and 2123b, 2223a and 2223b, and the second transparent member 2324 are disclosed, and various methods for increasing the FOV under limited conditions may be provided.

Figure 29:
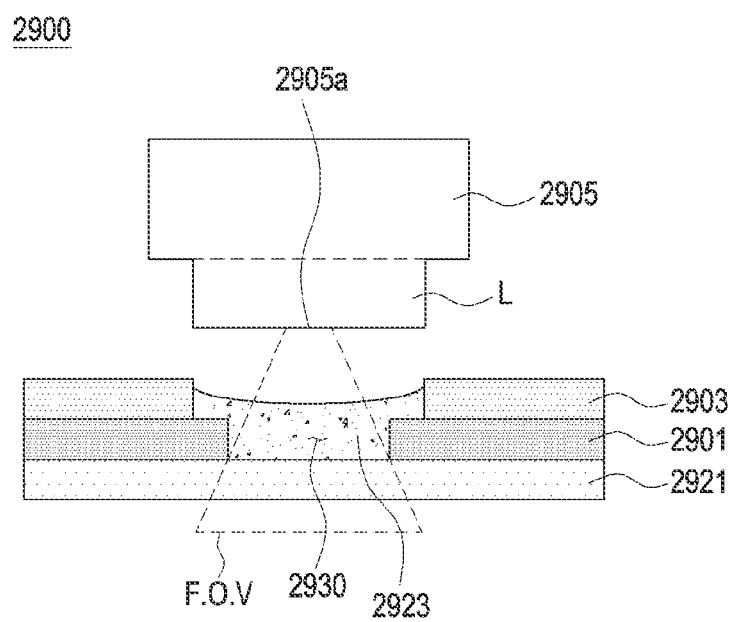
FIG. 29 is a view illustrating a state in which a recess is formed in a display and a supporting member supporting the display in an electronic device according to various embodiments of the disclosure.
Figure 30:
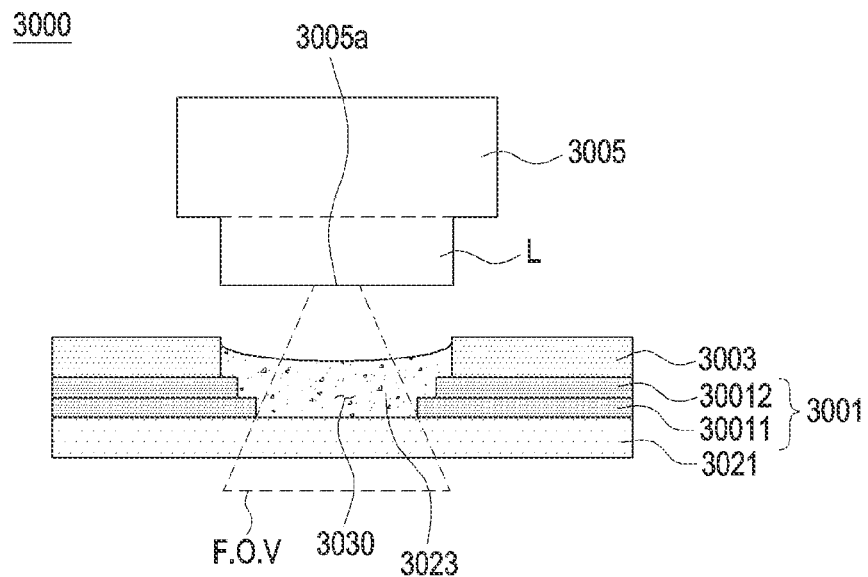
FIG. 30 is a view illustrating a state in which a recess has a step structure and is filled with a filling member in an electronic device according to various embodiments of the disclosure.
Figure 31:
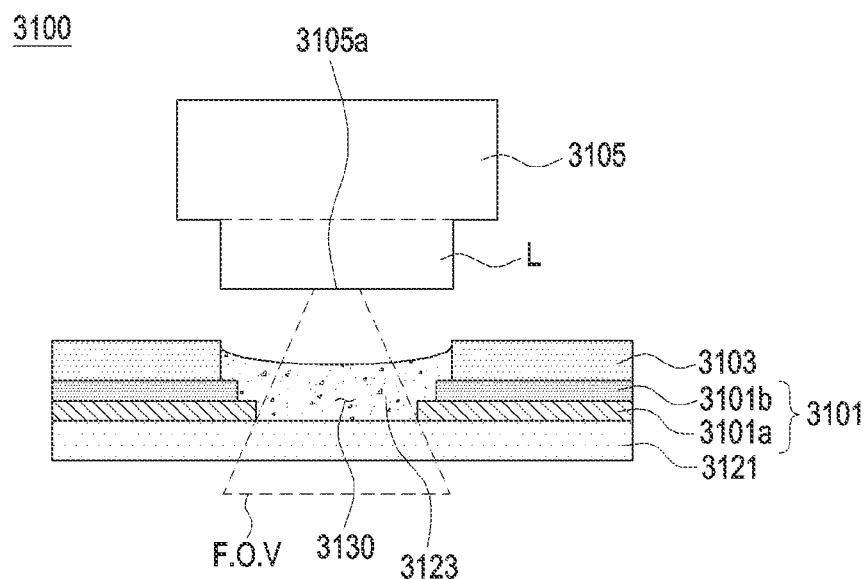
FIG. 31 is a view illustrating a state in which a recess has a step structure and is filled with a filling member in an electronic device according to embodiments other than that of FIG. 30.

FIG. 29 is a view illustrating a state in which a recess is formed in a display and a supporting member supporting the display in an electronic device 2900 according to various embodiments of the disclosure. FIG. 30 is a view illustrating a state in which a recess has a step structure and is filled with a filling member in an electronic device 3000 according to various embodiments of the disclosure. FIG. 31 is a view illustrating a state in which a recess has a step structure and is filled with a filling member in an electronic device according to embodiments different from those of FIG. 30.

Referring to FIG. 29, an electronic device 2900 may include a recess 2930, but the recess 2930 may be formed in the display 2901 but not in the masking layer (e.g., 722 of FIG. 7). Such an embodiment may be applied when the camera module 2905 is mounted on the rear surface of the display 2901.

According to an embodiment, the electronic device 2900 may further include a supporting member 2903 supporting the rear surface of the display 2901. The supporting member 2903 may be any structure capable of supporting the display 2901, such as a bracket, a rear plate, or a side bezel structure.

The supporting member 2903 may be a component, e.g., a digitizer for enhancing the function of the display, a cushion layer, a black masking layer, and a heat dissipation sheet (e.g., Cu).

According to the embodiment illustrated in FIG. 29, the display 2901 may be disposed on the rear surface of the transparent member 2921, and a screen may be displayed through at least a portion of the transparent member 2921. The light passing through at least a portion (e.g., a transparent region) of the transparent member 2921 may be directed toward the camera module and may be guided by the recess 2930. However, since the surface of the transparent member 2921 may be formed uneven during the manufacturing process, it may be supplemented by filling the recess 2930 with the filling member 2923.

According to the embodiment illustrated in FIG. 30, the display 3001 may include a plurality of substrate layers 30011 and 30012. The plurality of substrate layers 30011 and 30012 may form a stacked structure where a stepped recess 3030 may be formed. Since the filling member 3023 fills the recess 3030, an FOV may be easily secured.

According to the embodiment illustrated in FIG. 31, the electronic device 3100 may configure the display 3101 with at least two sub-displays 3101a and 3101b. The stacked structure of the sub-displays 3100a and 3100b may be a stack of at least one pixel. According to various embodiments, a stepped recess 3130 may be formed in the stacked structure of the display 3101 including at least two sub-displays 3101a and 3101b, and such type of recess 3130 may be filled with the filling member 3123, thus allowing it possible to easily secure an FOV.

The foregoing description given above in connection with FIGS. 1 to 28 may apply to other embodiments illustrated in FIGS. 29 to 31 than those described above.

An electronic device (e.g., 101 of FIG. 1) according to various embodiments of the disclosure may be various types of devices. The electronic device (e.g., 101 of FIG. 1) may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, there may be provided an electronic device (e.g., 700 of FIG. 7) comprising a housing including a first plate (e.g., 702 of FIG. 7) and a second plate (e.g., 718 of FIG. 7) disposed on a side of or behind the first plate and a camera module (e.g., 705 of FIG. 7) configured to obtain external information based on light passing through at least a portion of the first plate, wherein the first plate includes a transparent member (e.g., 721 of FIG. 7), at least a portion of the transparent member including a substantially transparent region, a masking layer (e.g., 722 of FIG. 7) disposed on a rear surface of the transparent member and forming an opaque region around the transparent region of the transparent member, a recess (e.g., 730 of FIG. 8) formed in the masking layer and formed to allow the light passing through the at least a portion of the first plate to be directed to the camera module, and a filling member (e.g., 723 of FIG. 7) filling the recess.

According to various embodiments, the filling member may be a liquid that is configured to be hardened after filling the recess. A middle portion of the filling member hardened in the recess may be flat, and an edge of the filling member may be curved.

According to various embodiments, the recess may widen away from a surface of the transparent member.

According to various embodiments, the recess may be a recess with a step structure (e.g., 1030 of FIG. 10).

According to various embodiments, the filling member may include a first filling member (e.g., 1223a of FIG. 12) contacting the transparent member and a second filling member (e.g., 1223b of FIG. 12) formed of a material different from the first filling member and stacked on the first filling member.

According to various embodiments, the electronic device may further comprise a second transparent member (e.g., 1624 of FIG. 16) disposed on the filling member, wherein at least a portion of the second transparent member is disposed in the recess.

According to various embodiments, the masking layer may include a first layer (e.g., 721a of FIG. 7) disposed on a rear surface of the transparent member and including a color, a second layer (e.g., 721b of FIG. 7) disposed on a rear surface of the first layer to prevent light leakage, and a third layer (e.g., 721c of FIG. 7) disposed on a rear surface of the second layer to protect the first layer and the second layer.

According to various embodiments, the transparent member may include a flat portion (e.g., 1021a of FIG. 11) and a curved portion (e.g., 1021b of FIG. 11) formed on periphery of the flat portion.

According to various embodiments, the recess may be formed on a rear surface of the flat portion.

According to various embodiments, the recess may be formed across a rear surface of the flat portion and the curved portion.

According to various embodiments, the recess may be formed over a rear surface of the curved portion.

According to various embodiments, a portion of the masking layer may be disposed on a rear surface of the flat portion, and another portion of the masking layer is disposed on a rear surface of the curved portion.

According to various embodiments, the electronic device may further comprise an adhesive layer (e.g., 1040 of FIG. 7) disposed between the masking layer and the housing.

According to various embodiments, the camera module may include a lens unit (e.g., L of FIG. 10). An imaging surface (e.g., 1005a of FIG. 10) formed on one surface of the lens unit may face the filling member and be spaced a predetermined distance apart from the filling member.

According to various embodiments, the electronic device may further comprise a display (e.g., 701 of FIG. 7) disposed between the first plate and the second plate and configured to display a screen through at least a portion of the first plate. The screen of the display may be displayed through the transparent region of the transparent member.

According to various embodiments of the disclosure, there may be provided an electronic device comprising a housing including a first plate (e.g., 1002 of FIG. 11) and a second plate (e.g., 1018 of FIG. 11) disposed on a side of or behind the first plate, a display (e.g., 1001 of FIG. 11) disposed between the first plate and the second plate and displaying a screen through at least a portion of the first plate, and a camera module (e.g., 1005 of FIG. 11) configured to obtain external information based on light passing through at least the portion of the first plate, wherein the first plate includes a transparent member (e.g., 1021 of FIG. 11) including a transparent region for displaying the screen of the display, a masking layer disposed on a rear surface of the transparent member and forming an opaque region around the transparent region of the transparent member, a stepped recess (e.g., 1030 of FIG. 10) formed on the masking layer and formed to allow light passing through at least the portion of the first plate to be directed to the camera module, and a filling member (e.g., 1023 of FIG. 11) filling the stepped recess.

According to various embodiments, the filling member (e.g., 1023 of FIG. 11) may include a first filling member (e.g., 1423a of FIG. 15) contacting the transparent member and a second filling member (e.g., 1423b of FIG. 15) formed of a material different from the first filling member and stacked on the first filling member.

According to various embodiments, the masking layer may include a first layer (e.g., 1022a of FIG. 11) disposed on a rear surface of the transparent member and including a color, a second layer (e.g., 1022b of FIG. 11) disposed on a rear surface of the first layer to prevent light leakage, and a third layer (e.g., 1022c of FIG. 11) disposed on a rear surface of the second layer to protect the first layer and the second layer.

According to various embodiments of the disclosure, there may be provided an electronic device comprising a transparent member (e.g., 2921 of FIG. 29), a display (e.g., 2901 of FIG. 29) displaying a screen through at least a portion of the transparent member, a supporting member (e.g., 2903 of FIG. 29) supporting a rear surface of the display, and a camera module (e.g., 2905 of FIG. 29) obtaining external information based on light passing through at least the portion of the transparent member, wherein a recess (e.g., 2930 of FIG. 29) is formed in each of the display and the supporting member to allow the light passing through at least the portion of the transparent member to be directed to the camera module, wherein a width of the recess formed in the supporting member is larger than a width of the recess formed in the display, and wherein the recess formed in the display and the supporting member is filled with a filling member (e.g., 2923 of FIG. 29).

According to various embodiments, the filling member include a first filling member (e.g., 1423*a* in FIG. 15) contacting the transparent member and a second filling member (e.g., 1423*b* of FIG. 15) formed of a different material from the first filling member and stacked on the first filling member.

It is apparent to one of ordinary skill in the art that an electronic device comprising a camera module of the disclosure as described above is not limited to the above-described embodiments and those shown in the drawings, and various changes, modifications, or alterations may be made thereto without departing from the scope of the disclosure.

The invention claimed is:

1. An electronic device, comprising:
   a housing including a first plate and a second plate disposed on a side of or behind the first plate; and
   a camera module configured to obtain external information based on light passing through at least a portion of the first plate,
   wherein the first plate includes:
      a transparent member, at least a portion of the transparent member including a transparent region,
      a masking layer disposed on a rear surface of the transparent member and forming an opaque region around the transparent region of the transparent member,
      a recess formed in the masking layer and formed to allow the light passing through the at least a portion of the first plate to be directed to the camera module, and
      a filling member, which is transparent and fills the recess.

2. The electronic device of claim 1, wherein the filling member is a liquid that is hardened after filling the recess, wherein a middle portion of the filling member hardened in the recess is flat, and an edge of the filling member is curved.

3. The electronic device of claim 1, wherein the recess widens away from a surface of the transparent member.

4. The electronic device of claim 1, wherein the recess is a recess with a step structure.

5. The electronic device of claim 1, wherein the filling member includes a first filling member contacting the transparent member and
a second filling member formed of a material different from the first filling member and stacked on the first filling member.

6. The electronic device of claim 1, further comprising a second transparent member disposed on the filling member, wherein at least a portion of the second transparent member is disposed in the recess.

7. The electronic device of claim 1, wherein the masking layer includes:
   a first layer disposed on a rear surface of the transparent member and including a color,
   a second layer disposed on a rear surface of the first layer to prevent light leakage, and
   a third layer disposed on a rear surface of the second layer to protect the first layer and the second layer.

8. The electronic device of claim 1, wherein the transparent member includes a flat portion and a curved portion formed on periphery of the flat portion.

9. The electronic device of claim 8, wherein the recess is formed on a rear surface of the flat portion.

10. The electronic device of claim 8, wherein the recess is formed across a rear surface of the flat portion and the curved portion.

11. The electronic device of claim 8, wherein the recess is formed over a rear surface of the curved portion.

12. The electronic device of claim 8, wherein a portion of the masking layer is disposed on a rear surface of the flat portion, and another portion of the masking layer is disposed on a rear surface of the curved portion.

13. The electronic device of claim 1, further comprising an adhesive layer disposed between the masking layer and the housing.

14. The electronic device of claim 1, wherein the camera module includes a lens unit, and
   wherein an imaging surface formed on one surface of the lens unit faces the filling member and is spaced a predetermined distance apart from the filling member.

15. The electronic device of claim 1, further comprising a display disposed between the first plate and the second plate and configured to display a screen through at least a portion of the first plate,
   wherein the screen of the display is displayed through the transparent region of the transparent member.

\* \* \* \* \*